United States Patent

[11] 3,617,704

[72] Inventors Christos B. Kapsambelis
Canton, Mass.;
Thomas P. Morehouse, Lyndeboro, N.H.;
Robert H. Reif, Groton; Francis H. Stites,
Wayland, Mass.
[21] Appl. No. 865,661
[22] Filed Oct. 13, 1969
[45] Patented Nov. 2, 1971
[73] Assignee Sylvania Electric Products, Inc.

[54] SIGNAL-PROCESSING SYSTEM
18 Claims, 21 Drawing Figs.
[52] U.S. Cl. .................................................. 235/61.11,
340/146.3
[51] Int. Cl. ...................................................... G06k 7/00,
G06k 7/10
[50] Field of Search .......................................... 235/61.11,
61.115, 61.7; 340/146.3 RR, 146.3 ID; 250/219
ID, 220

[56] References Cited
UNITED STATES PATENTS
3,417,231 12/1968 Stites et al. .................. 235/61.11 (5)
*Primary Examiner*—Daryl W. Cook
*Assistant Examiner*—Thomas J. Sloyan

*Attorneys*—Norman J. O'Malley, Elmer J. Nealon and Peter Xiarhos

ABSTRACT: A coded-vehicle identification system including pulse loading logic circuitry for processing code pulses derived in response to scanning a coded retroreflective label affixed to a vehicle. The label comprises a vertical array of rectangular orange, blue, and white retroreflective stripes, and black nonretroreflective stripes arranged in a plurality of selected stripe-pair code combinations. The individual light patterns successively retroreflected from the stripe-pairs, in response to the individual stripe-pairs being successively scanned with incident light, are converted by standardizer circuitry into corresponding electrical code pulses and applied to pulse loading logic circuitry.

The pulse loading logic circuitry operates to determine the width of each of the code pulses and, if the widths of the pulses satisfy certain preestablished pulse-width criteria for valid label-derived pulses, the code pulses are assumed to be valid label-derived pulses and then loaded into and stored in a plurality of storage shift registers. During various stages of the processing of the code pulses, prior to and following the loading of the code pulses into the storage shift registers, additional time measurement tests are also performed to determine whether the timing of the code pulses satisfies preestablished timing criteria for valid label-derived pulses. If the width or timing of any code pulse is determined not to satisfy the preestablished criteria for valid label-derived pulses, final processing thereof is prevented.

INVENTORS.
CHRISTOS B. KAPSAMBELIS,
THOMAS P. MOREHOUSE,
ROBERT H. REIF and
FRANCIS H. STITES BY Peter Xiarhos
AGENT.

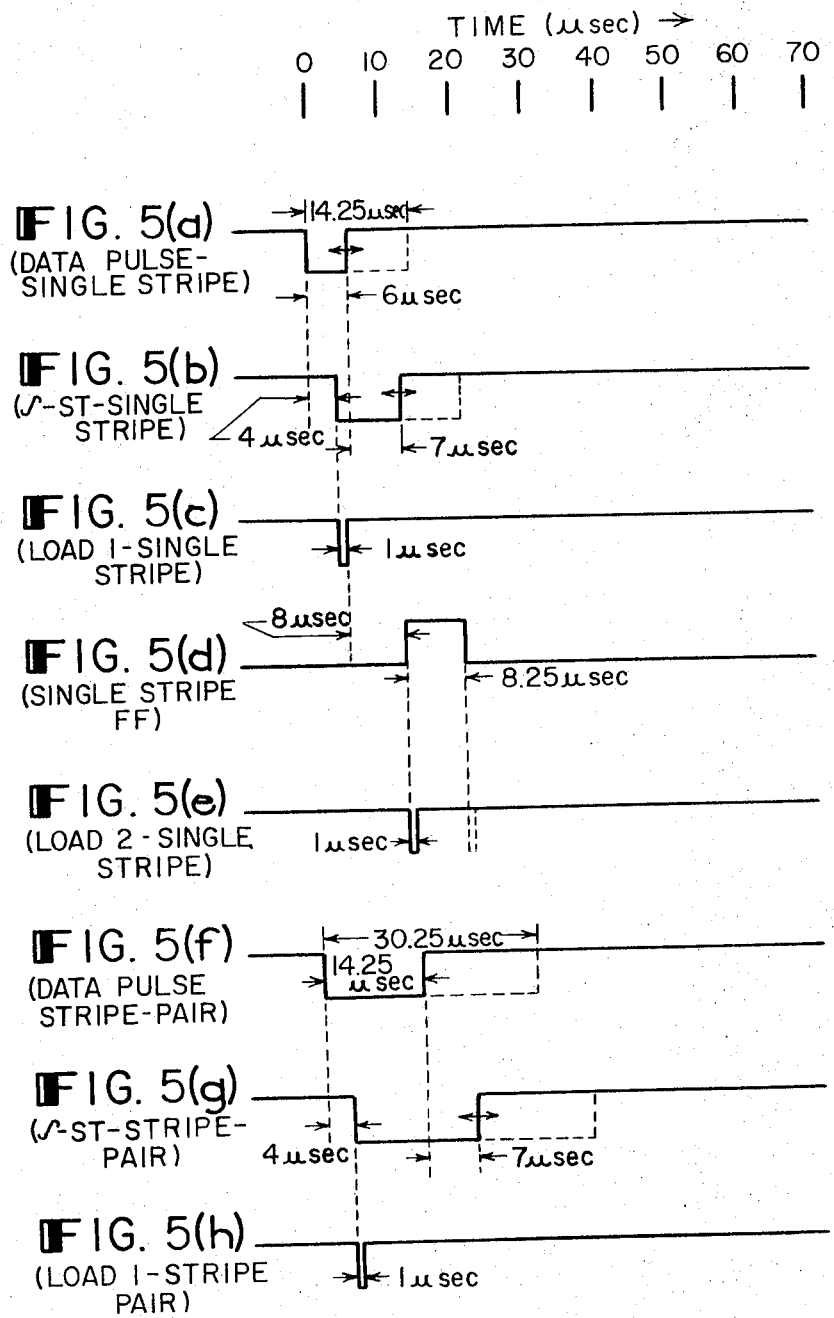

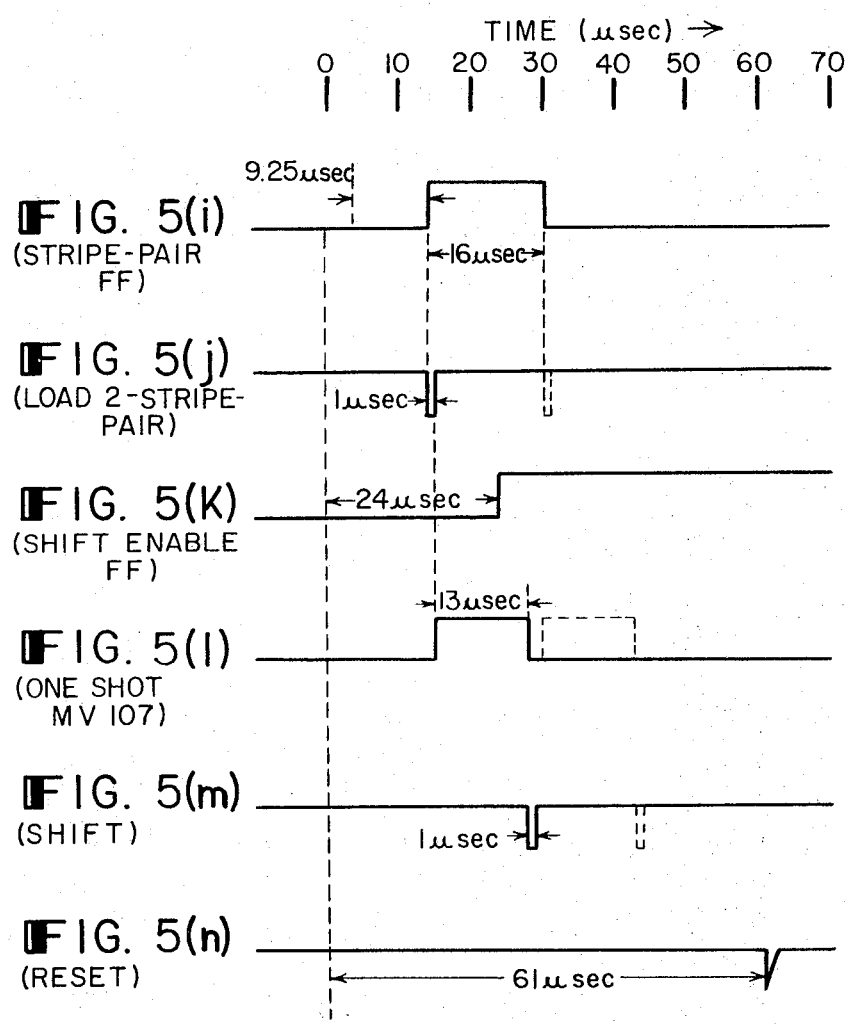

SIGNAL-PROCESSING SYSTEM

BACKGROUND OF THE INVENTION

The present invention relates to signal-processing circuitry. More particularly, it is concerned with a coded-object identification system including pulse-loading logic circuitry for processing electrical pulses derived in response to scanning a coded retroreflective label affixed to an object such as a vehicle.

One well-known coded-object identification system for deriving information from coded retroreflective labels affixed to objects, for example, railway vehicles, is described in detail in U.S. Pat. No. 3,225,177 to Francis H. Stites and Raymond Alexander, assigned to the same assignee as the present application. In the above-mentioned system, a railway vehicle is provided with a vertically oriented retroreflective label including, in a vertical array, a plurality of equal width, rectangular retroreflective orange, blue, and white stripes, and non-retroreflective black stripes. The stripes of the four colors are arranged in a plurality of selected paired combinations, in accordance with a two-position base-four code format, to represent the identity or other information pertaining to the vehicle. Distinguishable coded START and STOP stripe-pairs, representing START and STOP control words, respectively, are also provided at opposite ends of the array of stripe-pairs to respectively initiate and terminate processing of the data content of the label.

In the operation of the above-mentioned coded-vehicle identification system, the vehicle moves along a horizontal path past a trackside optical scanning unit, and the various stripes of the coded retroreflective label affixed to the vehicle are scanned in succession, from bottom to top, by light from the trackside optical scanning unit. The incident light directed onto each stripe of the label is retroreflected and returned along the path of the incident light to an optical processing system including a pair of photosensors which are selectively energized by the light retroreflected from the various label stripes. More particularly, an "orange-responsive" photomultiplier is provided which produces an output signal in response to light retroreflected from either an orange stripe or a white stripe (white retroreflected light including an "orange" component), and a "blue-responsive" photomultiplier is provided which produces an output signal in response to light retroreflected from either a blue stripe or a white stripe (white retroreflected light including a "blue" component). Thus, both photomultipliers are energized simultaneously to produce respective output signals in response to light retroreflected from a white stripe. Neither photomultiplier is energized to produce an output signal when a black stripe is scanned inasmuch as, previously stated, the black stripes are non-retroreflective.

The individual output signals produced by the orange-responsive and blue-responsive photomultipliers are applied to respective "orange" and "blue" standardizer circuits. The "orange" and "blue" standardizer circuits operate to convert the output signals from the respective photomultipliers to standardized output pulses having a constant amplitude and each having either a first pulse width or a second pulse width. Specifically, the "orange" and "blue" standardizer circuits each produce standardized pulses of the first width in response to the respective orange-responsive and blue-responsive photomultipliers receiving retroreflected light from both stripes of a stripe-pair and standardized pulses of the second width in response to the respective photomultipliers receiving retroreflected light from only one of the stripes of a stripe-pair. Accordingly, because the stripes are of equal width, the first pulse width has a value approximately twice that of the second pulse width. The various standardized pulses of the first and second widths are applied to pulse-loading logic circuitry.

The pulse-loading logic circuitry is operable in response to the various standardized pulses from the standardizer circuits to "sample" the standardized pulses by means of appropriately timed loading or sampling signals which serve to load the pulses in a selective manner into a plurality of buffer flip-flops for temporary storage therein. More particularly, the pulse-loading logic circuitry samples each standardized pulse of the first pulse width (corresponding to a stripe-pair) twice, and each standardized pulse of the second pulse width (corresponding to a single stripe of a stripe-pair) once. In the case of a standardized pulse of the first pulse width, a first sample (corresponding to the first stripe of a stripe-pair) is taken at a first fixed period of time after the occurrence of the leading edge of the pulse, and a second sample (corresponding to the second stripe of the stripe-pair) is taken at a second fixed period of time after the first sample. The timing of the second sample relative to the first sample is selected to coincide with the center of a pulse that would be produced by scanning the second stripe of a stripe-pair while the stripe-pair is located in the center of the depth of field of the trackside scanning unit. In the case of a standardized pulse of the second pulse width, such pulse is either sampled at the first period of time after the occurrence of the leading edge thereof (if it corresponds to the first stripe of a stripe-pair) or at a time coinciding with the time of a second sampling (if it corresponds to the second stripe of a stripe-pair). After the standardized pulses corresponding to each stripe-pair have been properly stored in the buffer flip-flops, they are shifted into the input stages of a plurality of storage shift registers and then to readout apparatus for further processing.

Although the above-described system operates in a very satisfactory manner, under certain operating conditions errors may be introduced into the system which have the effect of causing the output pulses produced by the standardizer circuits to be longer or shorter than acceptable label-derived pulses. For example, dirt or other foreign matter on a label, or damage to or weathering of a label, or an out-of-tolerance label may cause the leading and/or trailing edges of a pulse, corresponding either to a stripe-pair of the label or a single stripe, to be produced at an improper time such that the relationship of the leading and trailing edges to each other does not satisfy preestablished criteria for acceptable, valid label-derived pulses. In addition to the above sources of error, on occasion, errors of a similar nature may also be introduced into the system, either singly or cumulatively, by the trackside-scanning apparatus (for example, due to slight variations in scanning speed) or by the standardizer circuitry (for example, due to unavoidable component aging).

Since the widths of individual pulses in the above-described system are not measured, and since reliance is placed to a significant degree on the leading edges of pulses to initiate the generation of sampling signals, it is possible for two samples of a pulse to be taken when, in fact, only a single sample should be taken, as in the case of a "single-stripe" standardized pulse being wider than the acceptable value, or, conversely, for only a single sample of a pulse to be taken when, in fact, two samples should be taken, as in the case of a "stripe-pair" standardized pulse being narrower than the acceptable value. In the above-mentioned examples, as a result of improper operation on the part of the pulse-loading logic circuitry, improper loading of pulses occurs and erroneous readouts are caused to be produced.

SUMMARY OF THE INVENTION

Briefly, in accordance with the present invention, a system is provided for processing information relating to an object and which utilizes both the leading and trailing edges of pulses for pulse-width-measuring purposes and for generating loading signals for loading the pulses into storage apparatus for further processing.

In accordance with the present invention, the system for processing the information relating to the object includes a plurality of code elements associated with the object and arranged in a predetermined code pattern to represent information relating to the object. The plurality of code elements comprises code elements of a first width, each having a first portion and a second portion, and code elements of a second width. By way of example, the code elements of the first and second widths may be radiation-reflecting elements such as light-reflecting retroreflective elements.

An information-sensing means is also provided for sensing in succession the information encoded in the plurality of code elements. More particularly, the information-sensing means operates in response to sensing the information encoded in each code element of the first width to produce a pair of successive electrical pulses corresponding to the first and second portions of the code element of the first width, and operates in response to sensing the information encoded in each code element of the second width to produce a single electrical pulse corresponding to the code element of the second width.

A first circuit means receives the various pulses produced by the information-sensing means and operates in response to each pair of pulses corresponding to a code element of the first width and produced by the information sensing means to produce a corresponding first gating signal (LOAD 1). The first circuit means also operates in response to each single pulse corresponding to a code element of the second width and produced by the information sensing means to produce a corresponding first gating signal (LOAD $1^1$). 1). A timing circuit means also receives the various pulses produced by the information sensing means. In the case of a pair of pulses corresponding to a code element of the first width, the timing circuit means operates in response to the leading edge of the first pulse and the trailing edge of the second pulse to determine whether the leading and trailing edges occur within a predetermined first time duration. If the leading and trailing edges occur within the predetermined first time duration, a corresponding second gating signal (LOAD 2) is produced by the timing circuit means. In the case of a single pulse corresponding to a code element of the second width, the timing circuit means operates to determine whether the leading and trailing edges thereof occur within a predetermined second time duration. If the leading and trailing edges occur within the predetermined second time duration, a corresponding second gating signal (LOAD $2^1$) is produced by the timing circuit means.

In addition to the above-described means, a storage means is provided for storing information-representing signals and a signal-presenting means is provided for presenting to the storage means information-representing signals corresponding to the various pulses produced by the information-sensing means. More particularly, in the case of a pair of pulses corresponding to a code element of the first width and produced by the information-sensing means, the signal-presenting means operates in response to the first and second pulses of the pair of pulses to present corresponding first and second information-representing signals ($I_1$) and ($I_2$) to the storage means. In the case of a single pulse corresponding to a code element of the second width and produced by the information sensing means, the signal-presenting means operates in response to said pulse to present corresponding first and second information-representing signals ($I_1^1$) and ($I_2^1$) to the storage means. To load the various information-representing signals mentioned above into the storage means, a second circuit means is provided which operates in response to the first and second gating signals (LOAD 1) and (LOAD 2) corresponding to each code element of the first width to gate into the storage means the first and second information-representing signals ($I_1$) and ($I_2$) corresponding to said code element and, in response to the first and second gating signals (LOAD $1^1$) and (LOAD $2^1$) corresponding to each code element of the second width, to gate into the storage means the first and second information-representing signals ($I_1^1$) and ($I_2^1$) corresponding to said code element.

As will be described hereinafter, additional means are provided in accordance with the present invention to determine whether the various pulses and information-representing signals produced in the system satisfy preestablished timing criteria. More particularly, a first timing-checking means is provided for preventing further processing of information-representing signals stored in the storage means and corresponding to a given code element if new pulses are produced by the information sensing means within a predetermined time duration after the information-representing signals have been gated into the storage means by the corresponding loading signal (LOAD 2) or (LOAD $2^1$). A second timing-checking means is also provided for measuring the times occurring between successive sets of pulses produced by the information-sensing means, corresponding to successive code elements, to determine whether such times satisfy preestablished criteria.

BRIEF DESCRIPTION OF THE DRAWINGS

The invention is more fully described in the following detailed description, taken in conjunction with the accompanying drawings in which:

FIG. 3($b$) is a plan view of a partially silvered mirror employed in the optical system of FIG. 3($a$);

FIG. 3($c$) is a plan view of an optical mask employed in the optical system of FIG. 3($a$);

FIGS. 5($a$) through 5($n$) are waveforms of signals appearing at various points in the portions of the automatic coded vehicle identification system illustrated in FIGS. 4($a$) and 4($b$) during typical system operation.

GENERAL DESCRIPTION OF THE INVENTION–FIG. 1

Figure 1:
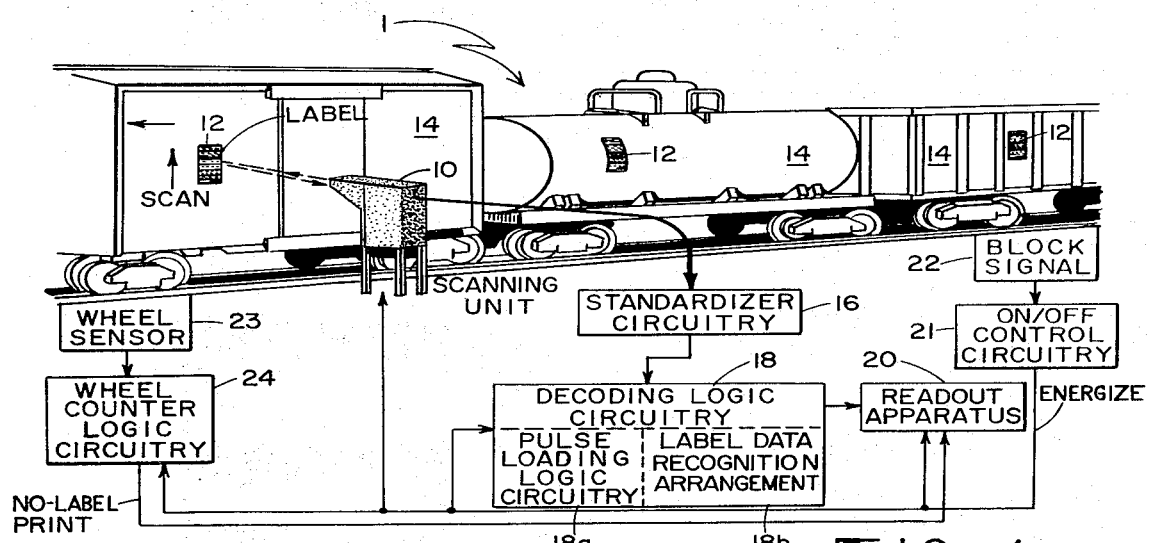
FIG. 1 is a diagrammatic representation partially in block diagram form of an automatic coded-vehicle identification system including pulse-loading logic circuitry in accordance with the present invention.
Figure 2:
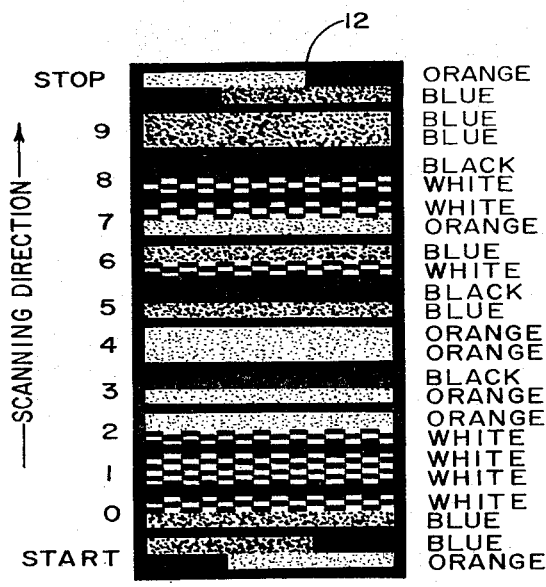
FIG. 2 is a diagrammatic representation of an exemplary two-position base-four coded retroreflective label which may be employed in the automatic coded-vehicle identification system of FIG. 1.

Referring to FIG. 1, there is shown partially in block diagram form an automatic coded-vehicle identification system 1 in accordance with the present invention. As shown in FIG. 1, the vehicle identification system 1 includes a trackside optical scanning unit 10 which is adapted to scan vertically an incident light beam across a coded retroreflective label 12 affixed to the side of a railroad car 14. An exemplary form of the label 12 is shown in FIG. 2, to be described in detail hereinafter, and includes a plurality of orange, blue, and white retroreflective stripes, and black non-retroreflective stripes, arranged in selected two-stripe code combinations to represent the identity or other information pertaining to the vehicle 14. The trackside optical scanning unit 10 may be located several feet from the track and typically scans through a vertical range of about 9 feet such that the label 12 can be placed on the railroad car 14 anywhere within the 9-foot vertical range and still be read by the scanning unit 10.

Light reflected from the label 12 is returned to and received by the scanning unit 10 and selectively converted thereby into coded electrical signals representative of the information encoded in the label 12. More particularly, an "orange-responsive" photomultiplier is provided in the scanning unit 10 for producing an output signal in response to light retroreflected from either an orange stripe or a white stripe of the label 12 (white retroreflected light including an "orange" component), and a "blue-responsive" photomultiplier is provided in the scanning unit 10 for producing an output signal in response to light retroreflected from either a blue stripe or a white stripe of the label 12 (white retroreflected light including a "blue" component). Thus, both photomultipliers are energized simultaneously to produce respective output signals in response to light retroreflected from a white stripe. As stated previously, neither of the photomultipliers is energized to produce an output signal when a black stripe is scanned inasmuch as the black stripes are non-retroreflective.

The various output signals produced by the orange-responsive and blue-responsive photomultipliers are applied to standardizer circuitry 16. The standardizer circuitry 16 operates to remove a significant portion of the distortion of the electrical signals received from the scanning unit 10 and to provide standardized pulses, each of a first width (corresponding to a stripe-pair) or a second width (corresponding to a single stripe of a stripe-pair), and representative of the information encoded in the label 12. Typically, the above-mentioned distortion of the electrical signals from the trackside optical scanning unit 10 may be caused by such factors as the variation or swaying of the vehicle 14 as it passes the scanning unit 10, changes in optical focusing, irregularities or damage to the label itself due to weathering or dirt, or slight misalignment between the label and optical apparatus included in the scanning unit 10. The standardizer circuitry may be of a type described in the aforementioned patent to Stites and Alexander or, alternatively, of a type disclosed in detail in U.S. Pat. No. 3,229,271 to Francis H. Stites, assigned to the same assignee as the present application.

The standardized pulses produced by the standardizer circuitry 16 are decoded by decoding logic circuitry 18 which includes pulse-loading logic circuitry 18a and a label data recognition arrangement 18b. As will be described in detail hereinafter, the pulse-loading logic circuitry 18a operates to determine the width of each individual standardized pulse received from the standardizer circuitry 16 and, if the widths of the pulses satisfy certain preestablished pulse-width criteria for valid label-derived pulses, the pulses are assumed to be proper label-derived pulses and loaded into a plurality of storage shift registers included in the decoding logic circuitry 18. As will also be described in detail hereinafter, during various stages of the processing of the code pulses, prior to and following the loading of the code pulses into the storage shift registers, additional time measurement tests are performed by the pulse-loading logic circuitry 16 to determine whether the timing of the code pulses satisfies preestablished timing criteria for valid label-derived pulses. If the width of timing of any code pulse is determined to be improper or incorrect, that is, not to satisfy the preestablished criteria for valid label-derived pulses, further processing thereof is prevented. If it is determined by the pulse-loading logic circuitry 18a that the standardized pulses produced by the standardizer circuitry 16 satisfy all pulse-width and timing criteria for valid label-derived pulses, additional processing of the pulses is performed in the storage shift registers.

The label data recognition circuitry 18b shown in FIG. 1 operates to examine the contents of the storage shift registers to determine as a final test whether the pulses stored therein are proper label-derived pulses and not "noise" pulses resembling proper label-derived pulses and caused by sources extraneous to the label 12, for example, dirt, rain, or snow that might be present on the label 12, or sources such as the side of the railroad car 14, or the sun. If the pulses are determined to be proper label-derived pulses by the label data recognition arrangement 18b, decoded output signals representative of the data content of the label 12 are caused to be produced by the decoding logic circuitry 18 and applied to a readout apparatus 20.

The vehicle identification system 1 of FIG. 1 is in an inoperative condition until a railroad car, such as shown at 14 in FIG. 1, enters the signal block within which the scanning unit 10 is located. When the railroad car 14 enters the signal block, a command from a block signal 22, a standard item of railroad signalling equipment, energizes the trackside scanning unit 10 and the associated electronics via ON/OFF control circuitry 21. A wheel sensor 23 and a wheel counter logic circuitry 24 are also employed to sense the presence of the wheels of the vehicle 14 and to provide signals, designated NO-LABEL PRINT in FIG. 1, to the readout apparatus 20 concerning unlabeled or unreadable cars. The standardizer circuitry 16, the decoding logic circuitry 18, and the readout apparatus 20 are usually, although not necessarily, located remote from the trackside scanning unit 10 and are serviced by a transmission line link. Since the signal data rate in a practical embodiment of the invention is below 65 kilohertz, no compensation or amplification is needed for cable runs up to about 2 miles.

A detailed description of the label 12, the optical portions of the scanning unit 10, and the decoding logic circuitry 18, including the pulse-loading logic circuitry 18a in accordance with the present invention, will now be presented.

LABEL–FIG. 2

The coded retroreflective label 12, illustrated in detail in FIG. 2, is typically fabricated from a plurality of equal width rectangular, orange, blue, and white retroreflective stripes, and non-retroreflective black stripes. The orange, blue, and white retroreflective stripes have the capability of reflecting incident light directed thereon along the path of incidence whereas the black stripes effectively lack such a capability of retroreflection. The label 12, as shown in FIG. 2, is coded in a two-position base-four code by various two-stripe combinations of the retroreflective orange, blue, and white stripes, and the non-retroreflective black stripes, to represent information pertaining to the vehicle on which the label 12 is affixed. For purposes of illustration only, the label shown in FIG. 2 is encoded to represent a START control word, a plurality of digits 0 through 9, and a STOP control word. It is apparent from FIG. 2 that each of the "modules" or code "elements" representing the START control word, the digits 0, 1, 2, 4, 6, and 7, and the STOP control word has a first width and comprises two portions, and each of the "modules" or code "elements" representing the digits 3, 5, and 8 (having nonreflecting black second stripes) has a second width. Although 10 digits are encoded in a specific combination in the exemplary label 12 shown in FIG. 2, it is to be appreciated that a greater or lesser number of digits may be used for a particular application and arranged in any desired combination.

The coded stripe-pairs of the label 12 are separated by black nonreflecting spacers and are surrounded on the edges by a black nonreflecting border. The purpose of the nonreflecting spacers is to isolate the stripe-pairs from each other so as to facilitate processing of the data encoded in the stripe-pairs. The nonreflecting border serves to isolate the stripes of the label 12 from the background on which the label 12 is affixed thereby to prevent unwanted reflections from the background from interfering with the proper reading of the label and from causing false triggering of the various circuitry employed to process the data content of the label.

The START stripe-pair and the STOP stripe-pair, in response to being scanned with incident light from the trackside optical scanning unit 10, serve to respectively initiate and terminate processing of the data content of the label 12. As may be noted from FIG. 2, the individual stripes of the START stripe-pair and the STOP stripe-pair are shorter than the other stripes of the label 12 and overlap each other at a central region of the label 12. The purpose of this arrangement is to initiate reading of the label 12 only when a significant part of the label is within the field of the scanning unit 10. In this fashion, any foreign matter which may be present on the vehicle adjacent to the vertical edges of the label 12 does not interfere with the proper reading of the label 12. Additionally, if the vertical edges of the label 12 become tattered or otherwise deteriorated, the staggered arrangement of the START and STOP stripe-pairs prevents a reading of the label 12 on either edge and therefore minimizes the occurrence of an improper reading of the label.

As may also be noted from FIG. 2, a number of black areas are included in the white stripes of the label 12. The black areas are nonreflecting and serve to reduce the reflectivity of the white stripes to essentially equal that of the colored stripes. This use of nonreflecting black areas is desirable inasmuch as completely white stripes have the tendency to reflect light having a greater amplitude than light reflected from the other stripes, the result being that signal processing by the standardizer circuitry may be undesirably affected.

In a coded vehicle identification system which has operated satisfactorily, the vehicle-information label stripes of the label 12 (such as the code stripes for the digits 0–9) are 6 inches long and ⅜-inch wide, and the black nonreflecting spacers between stripe-pairs are ½-inch wide. The individual stripes of the START and STOP stripe-pairs are each 4 inches long and overlap each other by approximately 2 inches so that the reading of the label is not initiated until approximately 2 inches of the label is in view of the scanning unit.

OPTICAL SYSTEM

Figure 3A:
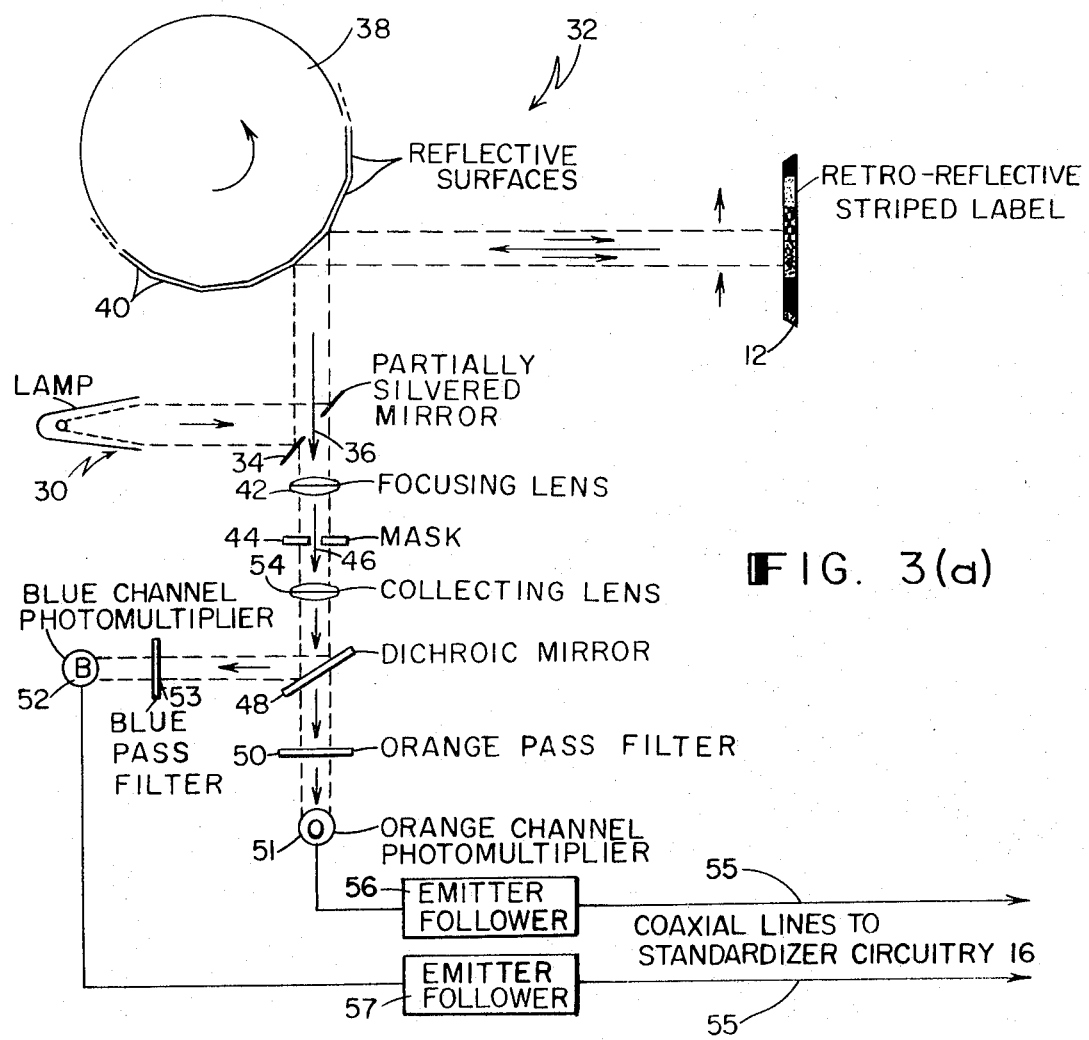
FIG. 3($a$) is a diagrammatic representation of an optical system and electrical transducers which may be employed in the automatic coded-vehicle identification system of FIG. 1.
Figure 3B:
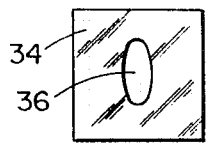
Figure 3C:
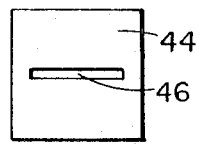

FIG. 3(a) is a diagrammatic representation of an optical system 32 incorporated in the scanning unit 10 of FIG. 1 for reading the label 12 shown in FIG. 2. As shown in FIG. 3(a), the optical system 32 comprises: a rotating wheel 38 having a plurality of reflective mirror surfaces 40 on its periphery; a lamp 30; a partially silvered mirror 34 provided with an elliptical aperture 36, shown more clearly in the plan view of FIG. 3(b); a focusing lens 42; a mask 44 provided with a rectangular viewing slot 46, shown more clearly in the plan view of FIG. 3(c); a collecting lens 54; a dichroic mirror 48; an orange pass filter 50; a blue pass filter 53; an orange channel photomultiplier 51; a blue channel photomultiplier 52; and a pair of emitter followers 56 and 57 connected, respectively, to the orange channel photomultiplier 51 and to the blue channel photomultiplier 52. Although reference may be made to the above-cited patent to Stites and Alexander for a detailed description of the operation of the optical system 32 of FIG. 3(a), for the purposes of a fuller understanding of the present invention, a brief description of the operation will be presented.

As the railroad car 14 bearing the coded retroreflective label 12 is presented to the optical system 32, an incident beam of light from the lamp 30 is reflected by the partially silvered mirror 34 onto the reflective mirror surfaces 40 of the rotating wheel 38. The light received by the reflective mirror surfaces 40 is further reflected onto the label 12 upon a rotation motion being imparted to the rotating wheel 18 by a suitable motor (not shown). The rotating wheel 38 typically is 14 inches in diameter, has twelve reflective mirror surfaces 40 on its periphery, rotates at 1,200 revolutions per minute, and is located approximately 9 feet from the railroad car 14.

The light directed onto the label 12, as indicated in FIG. 3(a), is retroreflected by each of the retroreflective stripes of the label 12 along the path of the incident light. The retroreflected light is returned onto the reflective mirror surfaces 40 of the rotating wheel 38, and then through the elliptical aperture 36 provided in the mirror 34. The elliptical aperture 36 presents a circular transmission path for the light reflected from the label 12 since the diagonal arrangement of the mirror 36 converts the ellipse to an effective circle with respect to the light path.

The retroreflected light which is received from the retroreflective stripes of the coded label 12 as the stripes are successively scanned constitutes the reflected image of the label 12. This reflected image of the label 12 is projected onto the mask 44 by the focusing lens 42. The dimensions of the rectangular viewing slot 46 are established so as to view at one time only a small portion of the entire width of each image of a stripe. Typical dimensions for the rectangular slot 46 are 0.5 inches long and 0.010 inches wide. Each portion of a stripe image sampled by the slot 46 is received by the collecting lens 54 and directed thereby onto the dichroic mirror 48.

As discussed in the above-cited patent to Stites and Alexander, when a four-color label is employed, two channels, an "orange" channel and a "blue" channel, are utilized. The dichroic mirror 48 divides the reflected light from the collecting lens 54 into orange and blue components by transmitting "orange" light through the orange pass filter 50 to the orange channel photomultiplier 51, and reflecting "blue" light through the blue pass filter 53 to the blue channel photomultiplier 52. The orange and blue stripes of the label 12 of FIG. 2 reflect light in the orange and blue spectrum, respectively. Thus, in response to an orange stripe being scanned, the photosensitive surface of the orange channel photomultiplier 51 is activated, and in response to a blue stripe being scanned, the photosensitive surface of the blue channel photomultiplier 52 is activated. The white stripes of the label 12 of FIG. 2 reflect light in both the orange and blue spectrum. Thus, in response to a white stripe being scanned, the photosensitive surfaces of both the orange channel photomultiplier 51 and the blue channel photomultiplier 52 are activated. As mentioned previously, the black stripes of the label 12 are nonreflecting and, accordingly, do not reflect light in either the orange or blue spectrum. In this case, neither the photosensitive surface of the orange channel photomultiplier 51 nor the photosensitive surface of the blue channel photomultiplier 52 is activated.

The output signals produced by the photomultipliers 51 and 52 are applied to the respective emitter followers 56 and 57 which transform the signals to a low impedance for suitable transmission over a pair of coaxial cables 55 to the standardizer circuitry 16 and then to the decoding logic circuitry 18.

PULSE LOADING LOGIC CIRCUITRY

Figure 4A:
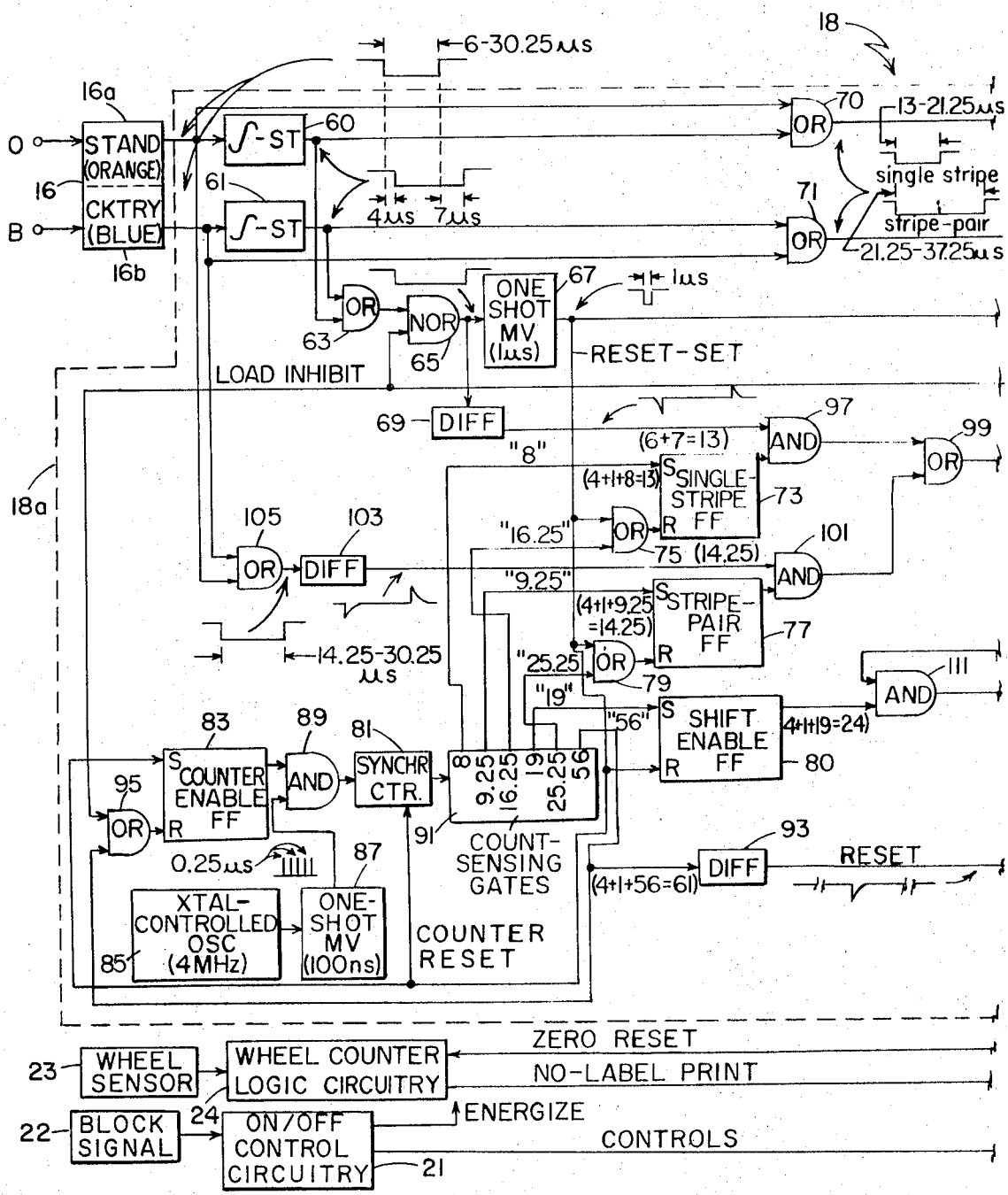
FIGS. 4($a$) and 4($b$), when taken together, illustrate in block diagram form and in greater detail than FIG. 1 various portions of the automatic coded-vehicle identification system of FIG. 1.
Figure 4B:
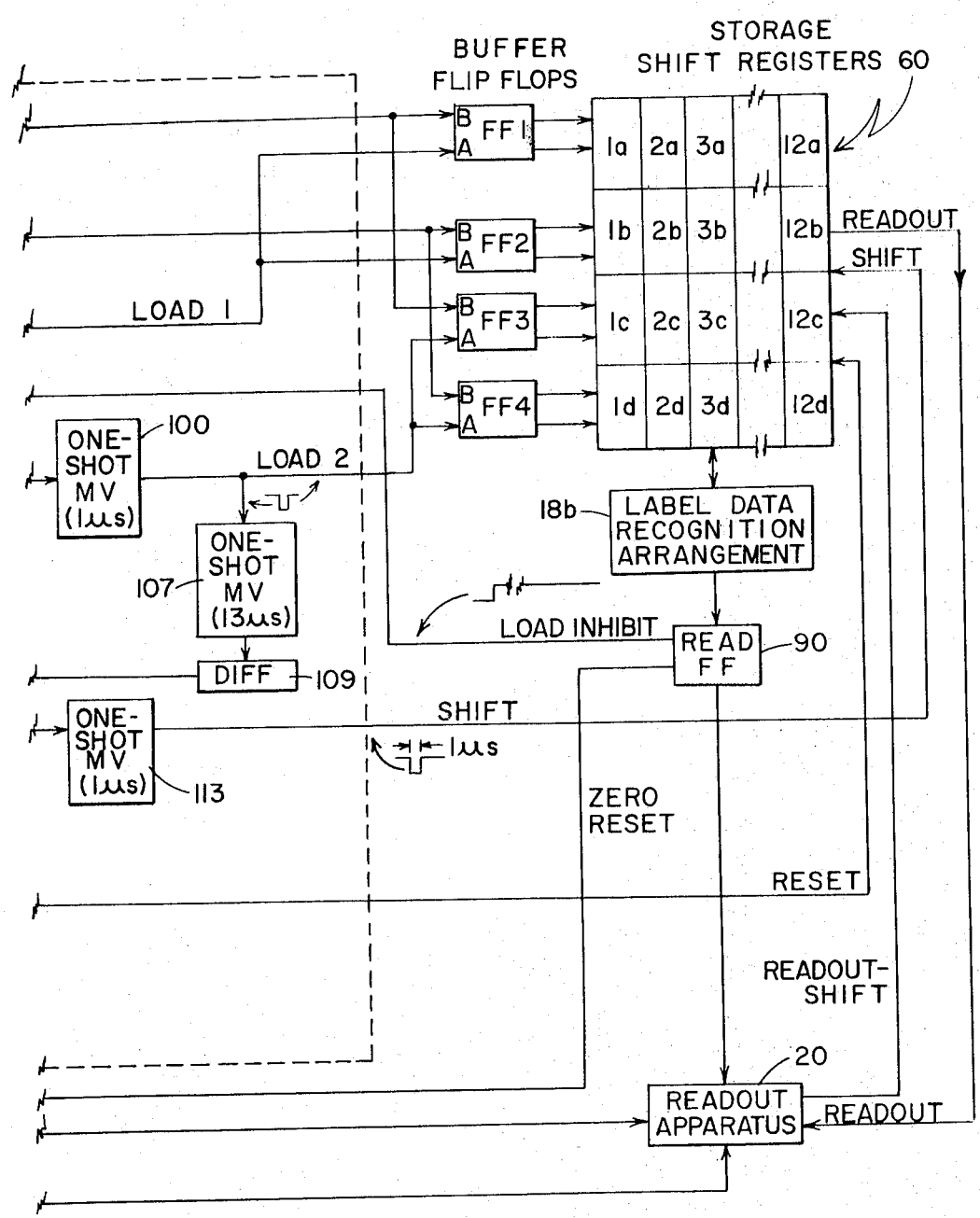

General Description and Operation–FIGS. 4(a) and 4(b)

Referring now to FIGS. 4(a) and 4(b), there is shown in detail the pulse-loading logic circuitry 18a in accordance with the present invention and also the manner in which the pulse-loading logic circuitry 18a is interconnected for operation with the remaining portions of the decoding logic circuitry 18, also illustrated in FIGS. 4(a) and 4(b).

As shown in the dotted block in FIGS. 4(a) and 4(b), the pulse-loading logic circuitry 18a includes a first integrator-Schmitt trigger circuit 60 connected to the output of an "ORANGE" standardizer section 16a of the standardizer circuitry 16, and a second integrator-Schmitt trigger circuit 61 connected to the output of a "BLUE" standardizer section 16a of the standardizer circuitry 16. The first integrator-Schmitt trigger circuit 60 is adapted to receive standardized "orange" pulses from the "ORANGE" standardizer section 16a, in response to orange or white stripes of a label being scanned, and, similarly, the second integrator-Schmitt trigger circuit 61 is adapted to receive standardized "blue" pulses from the "BLUE" standardizer section 16b in response to blue or white stripes of a label being scanned. As stated previously, each of the standardized output pulses produced by the standardizer circuitry 16, more specifically, the standardizer sections 16a and 16b, may have either a first width, corresponding to a stripe-pair of a label, or a second width, corresponding to a single stripe of a stripe-pair of a label. By way of a specific example, for the particular operating parameters of the coded-vehicle identification system 1 discussed briefly hereinabove in connection with FIG. 1, and for the specific coded label 12 discussed hereinabove in connection with FIG. 2, the first pulse width of the standardized pulses produced by the standardizer circuitry 16 (by either or both of the standardizer sections 16a and 16b ) may have a value of 14.25–30.25 microseconds, and the second pulse width of the standardized pulses produced by the standardizer circuitry 16 may have a value of 6–14.25 microseconds.

Each of the integrator-Schmitt trigger circuits 60 and 61, in response to receiving a standardized pulse from the respective standardizer section 16a or 16b (of the first width or the second width), operates to delay the leading edge of the standardized pulse by a predetermined first time duration and the trailing edge by a predetermined second time duration. By way of example, and for purposes of the present discussion, the first predetermined time duration (leading-edge delay) may have a value of 4 microseconds, and the second predetermined time duration (trailing-edge delay) may have a value of 7 microseconds. The purpose of the 4-microsecond leading-edge delay is to prevent the decoding logic circuitry 18 from processing spurious "noise" signals having widths of less than 4 microseconds and typically caused, for example, by dirt or other foreign matter on a label under scan, or by certain conditions of sunlight striking a label under scan. Under certain "clean" environmental conditions, the 4-microsecond delay operation may be omitted. The effect of the 4-microsecond leading-edge delay will become more fully apparent hereinafter from a detailed description of the operation of the pulse-loading logic circuitry 18a. As will also become more fully apparent hereinafter, the purpose of the 7-microsecond trailing-edge delay is to provide an appropriate signal level condition for controlling certain timing and gating operations of various portions of the pulse-loading logic circuitry 18a.

A particularly suitable integrator-Schmitt trigger circuit which may be employed in the present invention for each of the integrator-Schmitt trigger circuits 60 and 61 is described in detail in a copending patent application of Robert H. Reif, Ser. No. 787,756, filed Dec. 30, 1968, entitled "Integrator-Schmitt Trigger Circuit," and assigned to the same assignee as the present application. For additional or more specific details as to the arrangement and operation of such a circuit, reference may be made to the aforementioned Reif application.

Each leading-and-trailing-edge-delayed output pulse produced by either or both of the integrator-Schmitt trigger circuits 60 and 61 is applied via an OR-gate 63 to a first input terminal of a NOR-gate 65. A second, normally high signal, from a READ flip-flop 90 (FIG. 4(b)), to be described more fully hereinafter, is applied to a second input terminal of the NOR-gate 65 over a line designated in FIGS. 4(a) and 4(b) as LOAD INHIBIT. In accordance with the well-known operation of a NOR gate, when the signal applied to the first input terminal of the NOR-gate 65 (by either or both of the integrator-Schmitt trigger circuits) is low (after the 4-microsecond leading-edge delay), and the signal applied to the second input terminal of the NOR-gate 65 (over the LOAD INHIBIT line) is high, the NOR gate produces an output signal which is low, as indicated in FIG. 4(a). The low-level output signal produced by the NOR-gate 65 is applied to the input connection of a 1-microsecond one-shot multivibrator 67 and also to the input connection of a differentiator circuit 69.

The one-shot multivibrator 67, in response to the output signal produced by the NOR-gate 65, produces a 1-microsecond signal which is applied over a loading line, designated LOAD 1, to a pair of gating terminals A of a first pair of buffer flip-flops FF1 and FF2, and also to a RESET-SET line. The purpose of the signal on the LOAD 1 line is to load selectively into the buffer flip-flops FF1 and FF2, for temporary storage therein, standardized pulses produced by either or both of the standardizer sections 16a and 16b in response to the first stripe of a stripe-pair of a label being scanned. To insure in a positive manner that the standardized pulses are loaded in the buffer flip-flops FF1 and FF2, each of such standardized pulses is "stretched" before application to the buffer flip-flops FF1 and FF2. As indicated in FIG. 4(a), a pulse-stretched version of an "orange" standardized pulse (6-14.25 microseconds, before "stretching"), produced by the "ORANGE" standardizer section 16a in response to the first stripe of a stripe-pair being scanned, is derived by applying the "orange" standardized pulse directly to a first input terminal of an OR-gate 70 and by applying the corresponding leading-and-trailing-edge-delayed pulse produced by the corresponding integrator-Schmitt trigger circuit 60 to a second input terminal of the OR-gate 70. In response to the two input pulses applied thereto, the OR-gate 70 produces a "stretched" output pulse having a width exceeding the width of the "orange" standardized pulse by 7 microseconds. Alternatively, each standardized pulse may be delayed by a delay line before application to the buffer flip-flops FF1 and FF2. The "stretched" output pulse produced by the OR-gate 70 is applied to an input terminal B of the buffer flip-flop FF1 thereby insuring that a signal will be present at the input terminal B of the flip-flop FF1 at such time as a loading signal is applied by the one-shot multivibrator 67 to the associated gating terminal A over the LOAD 1 line. As may be noted, the output of the OR-gate 70 is also connected to an input terminal B of a buffer flip-flop FF3. As will be explained more fully hereinafter, the purpose of this connection is to allow a "stretched" "orange" standardized pulse (having a width of 6-14.25 microseconds, before "stretching") to be applied to the input terminal B of the buffer flip-flop FF3 in response to an orange or white second stripe of a stripe-pair being scanned.

In a similar fashion as discussed hereinabove, a pulse-stretched version of a "blue" standardized pulse (6-14.25 microseconds, before "stretching"), produced by the "BLUE" standardizer section 16b in response to the first stripe of a stripe-pair being scanned, is derived by applying the "blue" standardized pulse directly to a first input terminal of an OR-gate 71 and by applying the corresponding leading-and-trailing-edge-delayed pulse produced by the corresponding integrator-Schmitt trigger circuit 61 to a second input terminal of the OR-gate 71. As in the case of the OR-gate 70, the OR-gate 71, in response to the two input pulses applied thereto, produces a "stretched" output pulse having a width exceeding the width of the "blue" standardized pulse by 7 microseconds. The "stretched" output pulse produced by the OR-gate 71 is applied to an input terminal B of the buffer flip-flop FF2, thereby insuring that a signal will be present at the input terminal B of the flip-flop FF2 at such time as a gating signal is applied by the one-shot multivibrator 67 to the associated gating terminal A over the LOAD 1 line. Again, a delay line may be used instead of the OR-gate 71 for delaying each "blue" standardized pulse. As may be noted, the output of the OR-gate 71 is also connected to an input terminal B of a buffer flip-flop FF4. As will be explained more fully hereinafter, the purpose of this connection is to allow a stretched "blue" standardized pulse (6-14.25 microseconds, before "stretching") to be applied to the input terminal B of the buffer flip-flop FF4 in response to a blue or white second stripe of a stripe-pair being scanned. Thus, to briefly summarize at this point in the discussion, the first and second buffer flip-flops FF1 and FF2 are arranged to store, respectively, "stretched" "orange" and "blue" standardized pulses (6-14.25 microseconds, before "stretching") derived in response to the first stripe of a stripe-pair being scanned, and the third and fourth buffer flip-flops FF3 and FF4 are arranged to store, respectively, "stretched" "orange" and "blue" standardized pulses (6-14.25 microseconds, before "stretching") derived in response to the second stripe of a stripe-pair being scanned. It is to be noted that no standardized pulses are produced for a black nonretroreflective stripe and, further, that a black stripe is not employed as a first stripe of a stripe-pair.

PULSE-WIDTH MEASUREMENTS

During the time that the standardized pulses produced by either or both of the standardizer sections 16a and 16b in response to the first stripe of a stripe-pair being scanned are presented to and then entered into the buffer flip-flops FF1 and FF2 by a signal on the LOAD 1 line, as discussed hereinabove, the width of each of such pulses is measured, by apparatus now to be described, to determine if the pulses satisfy preestablished pulse-width criteria for valid label-derived pulses. If such pulses are determined to be of proper, acceptable width, a second load signal is generated on a second load line, designated LOAD 2, by the apparatus now to be described, for loading the standardized pulses derived in response to the second stripe of a stripe-pair being scanned, or binary "zeros" in the case of a black, non-retroreflective second stripe, into the second pair of buffer flip-flops FF3 and FF4. The total width of each standardized pulse corresponding to both stripes of a stripe-pair (14.25-30.25 microseconds), excepting stripe-pairs having black, non-retroreflecting second stripes, is also measured to determine whether it satisfies the preestablished pulse-width criteria for valid label-derived pulses.

The output pulse applied to the RESET-SET line by the one-shot multivibrator 67 is applied: (a) through an OR-gate 75 to a reset terminal R of a single-stripe flip-flop 73: (b) through an OR-gate 79 to a reset terminal R of a stripe-pair flip-flop 77; (c) to a reset terminal R of a shift enable flip-flop 80; (d) to a synchronous counter 81 via a COUNTER RESET line associated therewith; and (e) to a set terminal S of a counter enable flip-flop 83. In response to the output pulse from the one-shot multivibrator 67, the single-stripe 73 is placed in a "reset" condition, the stripe-pair flip-flop 77 is placed in a "reset" condition, the shift enable flip-flop 80 is placed in a "reset" condition, the synchronous counter 81 is placed in a "cleared" condition, and the counter enable flip-flop 83 is placed in a "set" condition.

A 4-megahertz crystal-controlled oscillator 85 repetitively triggers a 100-nanosecond one-shot multivibrator 87 at the 4-megahertz rate causing a train of very narrow pulses, 100 nanoseconds wide and spaced apart by 0.25 microseconds, to be produced at the output of the one-shot multivibrator 87 and applied to a first input terminal of an AND-gate 89. The pulses produced by the one-shot multivibrator 87 are gated through the AND-gate 89 by the high-level output signal produced by the counter enable flip-flop 83 when in the "set" condition. The signals gated through the AND-gate 89 are then counted by the synchronous counter 81, one pulse being counted every 0.25 microseconds.

Predetermined ones of the counts produced by the synchronous counter 81 after the synchronous counter 81 starts counting, namely, the counts of 8 microseconds, 9.25 microseconds, 16.25 microseconds, 19 microseconds, 25.25 microseconds, and 56 microseconds, are sensed in succession by a plurality of count-sensing gates 91. In response to sensing the aforementioned counts, appropriate timing signals are produced in succession by the count-sensing gates 91 for controlling the operation of various parts of the pulse-loading logic circuitry. More particularly, when the 8-microsecond count is sensed by the count-sensing gates 91, a first timing signal, designated in FIG. 4(a) as "8," is applied by the count-sensing gates 91 to a set terminal S of the single-stripe flip-flop 73; when the 9.25-microsecond count is sensed by the count-sensing gates 91, a second timing signal, designated "9.25," is applied thereby to a set terminal S of the stripe-pair flip-flop 77; when the 16.25-microsecond count is sensed by the count-sensing gates 91, a third timing signal, designated "16.25," is applied thereby through the OR-gate 75 to the reset terminal R of the single-stripe flip-flop 73; when the 19-microsecond count is sensed by the count-sensing gates 91, a fourth timing signal, designated "19," is applied thereby to a set terminal S of the shift enable flip-flop 80; when the 25.25-microsecond count is sensed by the count-sensing gates 91, a fifth signal, designated "25.25," is applied thereby through the OR-gate 79 to the reset terminal R of the stripe-pair flip-flop 77; and, finally, when the 56-microsecond count is sensed by the count-sensing gates 91, a sixth signal, designated "56," is applied thereby to a differentiator circuit 93 and also through an OR-gate 95 to a reset terminal R of the counter enable flip-flop 83. The purpose and effect of the various signals "8"-"56" produced by the count-sensing gates 91 will now be described.

The purpose of the "8" timing signal is: (1) to initiate the measurement of a standardized pulse of the aforementioned second width (6-14.25 microsecond) produced by either or both of the standardizer sections 16a and 16b in response to the first stripe of a stripe-pair being scanned, and wherein the second stripe of the stripe-pair is a non-retroreflecting black stripe; and (2) to initiate the generation of a loading signal, on the LOAD 2 line, for loading binary "zeros," corresponding to the black second stripe of the stripe-pair, into the buffer flip-flops FF3 and FF4 (the binary "zeros" positively replacing any information previously stored in the buffer flip-flops FF3 and FF4). To determine whether the above-mentioned 6-14.25-microsecond pulse-width requirement is satisfied, the "8" timing signal applied to the set terminal S of the single-stripe flip-flop 73 causes the single-stripe flip-flop 73 to be placed in its "set" condition and to provide a high-level output signal to a first input terminal of an AND-gate 97. A second signal is received by the AND-gate 97, at a second input terminal thereof, from the differentiator circuit 69. As indicated in FIG. 4(a), and as previously stated, the output signal produced by either or both of the integrator-Schmitt trigger circuits 60 and 61 is gated through the NOR-gate 65 to the differentiator circuit 69. The differentiator circuit 69 operates to differentiate the signal received from the NOR-gate 65, producing a negative-going spike corresponding to the leading edge of the signal from the NOR-gate 65 and a positive-going spike corresponding to the trailing edge.

The AND-gate 97 operated to produce an output signal only if the positive-going spike in the differentiated signal from the differentiator circuit 69 (corresponding to the trailing edge of the signal from the NOR-gate 65) is coincident with the high-level of the output signal produced by the single-stripe flip-flop 73. This condition is satisfied in the present system only if the standardized pulse produced by either or both of the standardizer sections 16a and 16b, in response to the first stripe of a stripe-pair being scanned (and wherein the second stripe is black), has a width of 6-14.25 microseconds. As will become fully apparent hereinafter, if the standardized pulse has a width less than the minimum 6-microsecond acceptable width, a positive-going spike (corresponding to the trailing edge) is produced by the differentiator circuit 69, but it occurs before the "8" timing signal has been presented to the set terminal S of the single-stripe flip-flop 73. Accordingly, the single-stripe flip-flop 73 is in the "reset" condition, the output signal therefrom is low, and, accordingly, no output signal is produced by the AND-gate 97. If the standardized pulse has a width greater than the maximum 14.25-microsecond acceptable width, again a positive-going spike (corresponding to the trailing edge) is produced by the differentiator circuit 69, but it occurs after the single-stripe flip-flop 73 has been reset by the "16.25" timing signal (via the OR-gate 75). Again, no output signal is produced by the AND-gate 97 due to the lack of coincidence of the two signals. The output signal produced by the AND-gate 97 when the standardized pulse is of proper width, as discussed above, is coupled via an OR-gate 99 to a 1 microsecond one-shot multivibrator 100. The one-shot multivibrator 100 operates in response to the output signal produced by the AND-gate 97 to produce a loading signal on the LOAD 2 line to load into the buffer flip-flops FF3 and FF4 binary "zeros" corresponding to the non-retroreflective black second stripe of the stripe-pair under discussion. (That is, the "stretched" standardized pulses corresponding to the first stripe of the stripe-pair have terminated and, in effect, binary "zero" information-representing signals are applied to the buffer flip-flops). In this manner, it is assured that any signals stored in the buffer flip-flops FF3 and FF4 due to previous operation are effectively eliminated from the buffer flip-flops FF3 and FF4 and replaced by the binary "zero" signals.

The purpose of the "9.25" timing signal produced by the count-sensing gates 91 is: (1) to initiate the measurement of a standardized pulse of the aforementioned first width (14.25-30.25 microseconds) occurring when both stripes of a stripe-pair are scanned, except when the second stripe of the stripe-pair is a black stripe; and (2) to initiate the generation of a loading signal on the LOAD 2 line for loading the standardized pulses produced by the standardizer sections 16a and 16b, in response to the second stripe of the stripe-pair being scanned, into the buffer flip-flops FF3 and FF4. To determine whether the above-mentioned 14.25–30.25-microsecond pulse-width requirement is satisfied, the "9.25" timing signal applied to the set terminal S of the stripe-pair flip-flop 77 causes the stripe-pair flip-flop 77 to be placed in its "set" condition and to provide a high-level output signal to a first input terminal of an AND-gate 101. A second signal is received by the AND-gate 101, at a second input terminal thereof, from a differentiator circuit 103. As indicated in FIG. 4(a), the standardized output pulses produced by either or both of the standardizer sections 16a and 16b in response to both stripes of a stripe-pair being scanned in succession are applied directly to an OR-gate 105. Since each standardized pulse produced by each of the standardizer sections 16a and 16b may have a minimum width of 6–14.25 microseconds (for example, due to reading an orange-blue stripe-pair) or a maximum width of 14.25–30.25 microseconds (for example, due to reading an orange-orange stripe-pair of a blue-blue stripe-pair), the output signal produced by the OR-gate 105 and applied to the differentiator circuit 103 has a width of 14.25–30.25 microseconds. The differentiator circuit 103 operates to differentiate the signal received from the OR-gate 105, producing a negative-going spike corresponding to the leading edge of the signal from the OR-gate 105 and a positive-going spike corresponding to the trailing edge.

The AND-gate 101 operates to produce an output signal only if the positive-going spike in the differentiated signal from the differentiator circuit 103 (corresponding to the trailing edge of the signal from the OR-gate 105) is coincident with the high-level of the output signal produced by the stripe-pair flip-flop 77. This condition is satisfied in the present system only if the standardized pulses produced by the standardizer sections 16a and 16b in response to a stripe-pair being scanned have individually a width of 14.25–30.25 microseconds (as in the case of reading an orange-orange, blue-blue, or white-white stripe-pair) or a combined effective width of 14.25–30.25 microseconds (as in the case of reading stripe-pairs wherein the two stripes are of two different colors selected from orange, and blue, e.g., orange-blue). In the latter case, the "combined" standardized pulse is produced at the output of the OR-gate 105 by combining two successive standardized pulses derived in response to reading the first and second stripes of the stripe-pair.

As will become fully apparent hereinafter, if an individual or "combined" standardized pulse has a width less than the minimum 14.25 microsecond acceptable width, but greater than 6 microseconds, for example 14 microseconds, a positive-going spike (corresponding to the trailing edge of the individual or "combined" standardized pulse) is produced by the differentiator circuit 103, but it occurs before the "9.25" timing signal has been presented to the set terminal S of the stripe-pair flip-flop 77. Accordingly, the stripe-pair flip-flop 77 is in the "reset" condition, the output signal therefrom is low, and no output signal is produced by the AND-gate 101 to cause a second loading signal to be produced on the LOAD 2 line. However, it is to be noted in this case that, while no loading signal is caused to be produced by the AND-gate 101 on the LOAD 2 line (via operation of the OR-gate 99 and the one-shot multivibrator 100), because the 14-microsecond pulse falls within the range of pulse widths (6–14.25 microseconds) processed, inter alia, by the single-stripe flip-flop 73 and the AND-gate 97, a loading signal is nonetheless caused to be produced on the LOAD 2 line by the AND-gate 97, in the manner previously described. In this case, the 14-microsecond pulse present at either or both of the input terminals B of the buffer flip-flops FF3 and FF4 (corresponding to the second stripe of a stripe-pair) are caused to be loaded therein. As will be apparent hereinafter, if these pulses stored in the buffer flip-flops FF3 and FF4 do not represent correct information, the signals being processed in the system are rejected by additional timing-checking apparatus, or by suitable parity-checking apparatus (not shown).

As will also become fully apparent hereinafter, if the individual or "combined" standardized pulse under discussion has a width greater than the maximum 30.25-microsecond acceptable width, again a positive-going spike (corresponding to the trailing edge) is produced by the differentiator circuit 103, but it occurs after the stripe-pair flip-flop 77 has been reset by the "25.25" timing signal (via the OR-gate 79). Again, no output signal is produced by the AND-gate 101 due to the lack of coincidence of the two signals. The output signal produced by the AND-gate 101 when the individual or "combined" standardized pulse under discussion is of proper width, as discussed hereinabove, is coupled via the OR-gate 99 to the one-shot multivibrator 100, thereby causing the one-shot multivibrator 100 to produce a loading signal on the LOAD 2 line to load the standardized pulses present at either or both of the input terminals B of the buffer flip-flops FF3 and FF4 into the buffer flip-flops FF3 and FF4.

PULSE-TIMING CHECK

After the standardized pulses corresponding to a given stripe-pair of a label have been completely entered into and stored in the four buffer flip-flops FF1–FF4, that is, after the termination of a loading signal on the LOAD 2 line (produced as a result of operation of the AND-gate 97 or the AND-gate 101), the pulses are retained in the buffer flip-flops FF1–FF4 for a predetermined time duration for example, 13 microseconds, for the purpose of performing an additional check on the pulses to further determine whether the pulses are proper label-derived pulses. Previous system analysis and experience has indicated that if "noise" pulses are present in the system, they generally precede data within a time period of approximately 13 microseconds. Therefore, if new pulses are received within the predetermined time period of 13 microseconds after pulses have been entered and stored in the buffer flip-flops FF1–FF4 (that is, 13 microseconds after the second loading signal on the LOAD 2 line), the pulses present in the buffer flip-flops FF1–FF4 are considered to be "noise" pulses and prevented from being further processed. Instead, the new pulses are pulse-width processed in the same manner as previously described and loaded into the buffer flip-flops FF1–FF4 to replace the previous pulses. If no new pulses are received during the 13 microsecond period, the pulses stored in the buffer flip-flops FF1–FF4 are considered for the moment to be valid label-derived pulses and they are shifted in a known manner by a shift signal on a SHIFT line into a plurality of storage shift registers 60 for further processing. The above-mentioned additional 13-microsecond timing check on the pulses stored in the buffer flip-flops FF1–FF4 is performed by a 13-microsecond one-shot multivibrator 107, a differentiator circuit 109, an AND-gate 111, a 1-microsecond one-shot multivibrator 113, and the shift enable flip-flop 80.

As indicated in FIG. 4(b), the second loading signal produced by the one-shot multivibrator 100 on the LOAD 2 line is applied to the 13-microsecond one-shot multivibrator 107. In response thereto, the one-shot multivibrator 107 produces an output pulse having a width of 13 microseconds. The output pulse produced by the one-shot multivibrator 107 is applied to the differentiator circuit 109 and differentiated thereby, producing a negative-going spike corresponding to the leading edge of the output pulse from the differentiator circuit 109 and a positive-going spike corresponding to the trailing edge. The differentiated signal from the differentiator circuit 109 is applied to a first input terminal of the AND-gate 111. A second input signal is received by the AND-gate 111, at a second input terminal thereof, from the shift enable flip-flop 80. The "19" timing signal applied to the set terminal S of the shift enable flip-flop 80 causes the shift enable flip-flop 80 to be placed in its "set" condition and to provide a high-level output signal to the AND-gate 111.

If, during the 13-microsecond time interval following the loading of pulses into the second pair of buffer flip-flops FF3 and FF4 by the second loading signal on the LOAD 2 line, no new pulses are produced in the system by the standardizer circuitry 16, the positive-going spike in the differentiated signal produced by the differentiator circuit 109 and the high-level output signal produced by the shift enable flip-flop 80 are in coincidence and the AND-gate 111 produces an output signal. The output signal from the AND-gate 111 causes the 1-microsecond one-shot multivibrator 113 to produce a 1-microsecond output signal (shift signal) on the SHIFT line to enable the pulses stored in the buffer flip-flops FF1–FF4 to be applied to the shift registers 60 for further processing. If, during the 13-microsecond time interval following the loading of pulses into the second pair of buffer flip-flops FF3 and FF4 by the second loading signal on the LOAD 2 line, new pulses are produced in the system by the standardizer circuitry 16, the new pulses are processed, in the same manner as previously described, by the integrator-Schmitt trigger circuits 60 and 61, the OR-gate 63, the NOR-gate 65, and the one-shot multivibrator 67. Thus, in accordance with the previous discussion, after 4 microseconds, the shift enable flip-flop 80 is placed in its "reset" condition, causing the output thereof to go low. Accordingly, no output signal is produced by the AND-gate 111, no shift signal is generated by the one-shot multivibrator 113 on the SHIFT line, and, accordingly, the pulses stored in the buffer flip-flops FF1–FF4 are considered to be "noise" and not further processed. Instead, the new pulses are processed completely in the same manner as previously described, thereby replacing, if valid, the pulses previously stored.

FINAL PULSE-TIMING CHECK

After the pulses stored in the buffer flip-flops FF1–FF4 have been shifted into the storage shift registers 60, another timing "check" is performed on the pulses still further to determine whether the pulses are actually proper label-derived pulses. In this check, the time occurring between the original production of such pulses by the standardized circuitry 16, using as a reference the leading edge of the first pulse produced in response to the first stripe of the original stripe-pair being scanned, and the production of new pulses by the standardizer circuitry 16, again using as a reference the leading edge of the first pulse produced in response to the first stripe of the next stripe-pair being scanned, is measured. For the previously described system operating parameters and for the specific label shown in FIG. 2, the time differential between the beginnings of the two successive sets of pulses, that is, the time differential between the leading edges of the two successive standardized pulses, has a value of approximately 61 microseconds. As may be noted from FIG. 4(b), the "56" timing signal sensed by the count-sensing gates 91 is applied to the differentiator circuit 93 61 microseconds (4+1+56=61) after the leading edge of the first standardized pulse produced by the standardizer circuitry 16 in response to the first stripe of the original stripe-pair being scanned. If no new pulses are produced within 61 microseconds of the first standardized pulse, the original pulses are considered to be "noise" and, hence, invalid. In this case, the "56" timing signal produced by the count-sensing gates 91 and applied to the differentiator 93 is differentiated by the differentiator circuit 93 causing a negative-going spike to be produced on a RESET line. The signal on the RESET line, indicating that no new pulses were produced by the standardizer circuitry 16 within the 61 microseconds, causes the storage shift registers 60 to be placed in the "reset" condition. In addition, the "56" timing signal causes the counter enable flip-flop 83 to be placed in the "reset" condition (via the OR-gate 95), thereby disabling the synchronous counter 81 by inhibiting the output of the 100-nanosecond one-shot multivibrator 87. If new pulses are produced by the standardizer circuitry 16 within the 61-microsecond duration, such pulses are processed by the integrator-Schmitt trigger circuits 60 and 61, the OR-gate 63, the NOR-gate 65, and the one-shot multivibrator 67, in the manner previously described, with the result that the synchronous counter 81 is placed in the "reset" condition (via the COUNTER RESET line) before the 56-microsecond count is reached and before the "56" signal can be produced by the count-sensing gates 91 and applied to the differentiator circuit 93.

STORAGE SHIFT REGISTERS 60

As shown in FIG. 4(b), the storage shift registers 60 comprise a plurality of sets of stages, designated 1a–1d, 2a–2d,— 12a–12d. The various stages are interconnected, in a manner disclosed in the aforementioned patent to Stites and Alexander, so as to store individually and successively the pulses derived as a result of scanning the START stripe-pair of the label 12 (FIG. 2), the digit stripe-pairs (0–9), and the STOP stripe-pair. In the operation of the storage shift registers 60, the pulses loaded into the buffer flip-flops FF1–FF4 by the loading signals on the LOAD 1 and LOAD 2 lines, in response to each stripe-pair of the label 12 being scanned, are applied and stored in succession in the sets of stages 1a–1d—12a–12d of the storage shift registers 60. The pulses corresponding to the START code word of the label 12 are stored first in the stages 1a–1d, and shifted (by signals on the SHIFT line) successively through the remaining sets of stages 2a–2d—12a–12d by the pulses corresponding to the remaining coded stripe-pairs. Thus, at the termination of a label-reading operation, the pulses corresponding to the START stripe-pair are stored in the last set of stages 12a–12d, the pulses corresponding to the digit stripe-pairs 0–9 are stored in the sets of stages 2a–2da—11a–11d, and the pulses corresponding to the STOP stripe-pair are stored in the set of stages 1a–1d.

LABEL DATA RECOGNITION ARRANGEMENT 18b

The pulses stored in the storage shift registers 60 are tested by the label data recognition arrangement 18b to determine as an information validity test whether the pulses pertain to valid label-derived data as opposed to "noise." Typically, the label data recognition arrangement 18b, a suitable implementation of which is disclosed in the aforementioned patent to Stites and Alexander, includes a first signal-sensing arrangement for detecting the presence in the last set of stages 12a–12d of the pulses corresponding to the START stripe-pair, and a second signal-sensing arrangement for detecting the presence in the first set of stages 1a–1d of the pulses corresponding to the STOP stripe-pair. In response to simultaneously detecting both of these sets of pulses in their proper locations in the storage shift registers 60, an output signal is produced by the label data recognition arrangement 18b and is applied to the read flip-flop 90. If the pulses present in the last set of stages 12a–12 and in the first set of stages 1a–1d do not correspond to the START and STOP stripe-pairs, respectively, as occurs for incorrectly processed "noise" signals, for example, no output signal is produced by the label data recognition arrangement 18b and applied to the read flip-flop 90.

PULSE READOUT OPERATION

The read flip-flop 90, in response to receiving an output signal from the label data recognition arrangement 18b, indicating that the pulses stored in the storage shift registers 60 are proper label-derived pulses, operates to cause the signal on the LOAD INHIBIT line to go low. The low signal on the LOAD INHIBIT line indicates that the storage shift registers 60 are full and serves to disable the NOR-gate 65, thereby preventing any further processing of pulses from the standardizer circuitry 16 until the storage shift registers 60 are again empty, at which time the signal on the LOAD INHIBIT line goes high again. The signal on the LOAD INHIBIT line is also applied to the counter enable flip-flop 83 (via the OR-gate 95) and serves to reset the counter enable flip-flop 83 thereby preventing the synchronous counter 81 from counting the pulses produced by the 100-nanosecond one-shot multivibrator 87.

The read flip-flop 90 also energizes the readout apparatus 20 to cause a shift signal to be produced by the readout apparatus 20 on a READOUT SHIFT line, to cause the pulses stored in the storage shift registers 60 to be applied to the readout apparatus 20 via a READOUT line. The read flip-flop 90 then resets the wheel counter logic circuitry 24 by a reset signal applied to a ZERO RESET line.

DETAILED OPERATION OF PULSE LOADING LOGIC CIRCUITRY 18a

FIGS. 4(a), 4(b), and 5(a)–5(n)

The operation of the pulse-loading logic circuitry 18a and its manner of cooperation with other potions of the decoding logic circuitry 18 shown in FIGS. 4(a) and 4(b) can better be understood by considering two specific, yet different, examples of the operation of the pulse-loading logic circuitry 18, and by reference to the various waveforms shown in FIGS. 5(a)–5(n). Consider, for example, that a white-black stripe-pair and a blue-blue stripe-pair are to be read. The operation of the pulse-loading logic circuitry 18a is as follows.

WHITE-BLACK STRIPE-PAIR

When the white stripe of the white-black stripe-pair is scanned (by the apparatus shown in FIG. 3(a)), a standardized pulse such as shown in FIG. 5(a), and having a width of 6–14.25 microseconds, is produced simultaneously by both of the standardizer sections 16a and 16b (retroreflected "white" light including "orange" and "blue" components). When the black stripe is next scanned, no output pulse is produced by either of the standardizer sections 16a and 16b inasmuch, as previously stated, black stripes are nonretroreflective. The coincident pulses produced concurrently by the standardizer sections 16a and 16b in response to the white first stripe being scanned are applied to the integrator-Schmitt trigger circuits 60 and 61, respectively, and the leading edge of each pulse is delayed by 4 microseconds and the trailing-edge by 7 microseconds, FIG. 5(b). The coincident leading-and-trailing-edge-delayed pulses produced concurrently by the integrator-Schmitt trigger circuits 60 and 61 are applied to the OR-gates 70 and 71, respectively, together with the corresponding undelayed coincident standardized pulses, causing coincident "stretched" versions of the standardized pulses (13–21.25 microseconds, after "stretching") to be produced and applied to the input terminals B of the buffer flip-flops FF1 and FF2, respectively. No pulses are applied to the input terminals B of the buffer flip-flops FF3 and FF4 in response to the black second stripe of the stripe-pair being scanned inasmuch, as previously stated, no output pulses are produced by the standardizer sections 16a and 16b in response to the black second stripe being scanned.

The coincident leading-and-trailing-edge-delayed pulses produced by the integrator-Schmitt trigger circuits 60 and 61 are also applied to the OR-gate 63, and after 4 microseconds (that is, when the output pulses of the integrator-Schmitt trigger circuits 60 and 61 go low), are gated through the NOR-gate 65 by the normally high signal applied to the LOAD INHIBIT line by the read flip-flop 90. It may be recalled that the read flip-flop 90 applies a high-level signal to the LOAD INHIBIT line when the storage shift registers are not completely full. The output pulse produced by the NOR-gate 65 is applied simultaneously to the differentiator circuit 69 and to the 1-microsecond one-shot multivibrator 67. The differentiator circuit 69 differentiates the signal from the NOR-gate 65, producing a negative-going spike corresponding to the leading edge of the pulse from the NOR gate and a positive-going spike corresponding to the trailing edge. The differentiated signal is applied to the AND-gate 97. On the leading edge of the output signal produced by the NOR-gate 65, the 1-microsecond one-shot multivibrator 67 is operated to produce a 1-microsecond pulse on the LOAD 1 line and also on the RESET-SET line, FIG. 5(c). output pulse produced by the one-shot multivibrator 67 on the LOAD 1 line is applied to the gating terminals A of the buffer flip-flops FF1 and FF2 and serves to load the "stretched" standardized pulses previously applied to the input terminals A of the buffer flip-flops FF1 and FF2 into the buffer flip-flops FF1 and FF2. Thus, each of the buffer flip-flops FF1 and FF2 may be considered to store a binary "one."

The output pulse produced by the one-shot multivibrator 67 on the RESET-SET line, FIG. 5(c), serves: to reset the single-stripe flip-flop 73 (via the OR-gate 75); to reset the stripe-pair flip-flop 77 (via the OR-GATE 79); to reset the shift enable flip-flop 80; to reset the synchronous counter 81 (via the COUNTER RESET line); and to set the counter enable flip-flop 83. With the counter enable flip-flop 83 in its set condition, the 4-megahertz crystal-controlled oscillator operates to cause 100-nanosecond pulses, spaced apart by 0.25 microseconds, to be produced by the 100-nanosecond one-shot multivibrator 87. The 100-nanosecond pulses produced by the 100-nanosecond one-shot multivibrator 87 are gated through the AND-gate 89 by the high-level output signal produced by the counter enable flip-flop 83, and then counted at intervals of 0.25 microseconds by the synchronous counter 81.

When the 8-microsecond count is sensed by the count-sensing gates 91, the "8" timing signal is applied to the set terminal S of the single-stripe flip-flop 73 to cause the output thereof to go from low to high, noting FIG. 5(d). As may be further noted from FIGS. 5(a) and 5(d), and as indicated in FIG. 4(b), the output signal of the single-stripe flip-flop 73 goes high 13 microseconds (4+1+8) after the leading edge of either of the coincident standardized pulses, as shown in FIG. 5(a), and goes low again after 8.25 microseconds, that is, when the "16.25" timing signal resets the single-stripe flip-flop 73 (via the OR-gate 75). It is apparent, therefore, that no output pulse will be produced by the AND-gate 97 to generate a loading signal on the LOAD 2 line (via the OR-gate 99 and the 1-microsecond one-shot multivibrator 100) unless the positive-going spike in the differentiated signal from the differentiator circuit 69 is applied to the AND-gate 97 during the 8.25 microsecond (16.25−8=8.25) "gating" interval produced at the output of the single-stripe flip-flop 73. This condition is satisfied so long as the standardized pulse, FIG. 5(a), produced by each of the standardizer sections 16a and 16b has a width of 6–14.25 microseconds.

For example, for a standardized pulse of the minimum acceptable width of 6 microseconds, the differentiator circuit 69 applies a positive-going spike (corresponding to the trailing-edge of the 6-microsecond pulse) to the AND-gate 97 13microseconds (6+7=13) after the leading-edge of the pulse, and the "8" timing signal ("set" signal) is applied to the single-stripe flip-flop 73 13microseconds (4+1+8=13) after the leading edge of the pulse. Since the two signals applied to the AND-gate 97 are in coincidence, an output signal is produced by the AND-gate 97 to initiate the generation of a loading signal on the LOAD 2 line. Similarly, if the standardized pulse has a maximum acceptable width of 14.25 microseconds, the differentiator circuit 69 applies a positive-going spike (corresponding to the trailing edge of the 14.25 microsecond pulse) to the AND-gate 97 21.25 microseconds (14.25+7 =21.25) after the leading edge of the pulse, and the "16.25" timing signal ("reset" signal) is applied to the single-stripe flip-flop 73 21.25 microseconds (4+1+16.25=21.25) after the leading edge of the pulse. Again, since the two signals applied to the AND-gate 97 are in coincidence, an output signal is produced by the AND-gate 97 to initiate the generation of a loading signal on the LOAD 2 line. By similar analysis, it can be shown that if a standardized pulse is less than 6 microseconds in width, or greater than 14.25 microseconds in width, the two input signals applied to the AND-gate 97 in each case are not coincident and, hence, no output signal is produced by the AND-gate 97. For example, for a 5-microsecond pulse, the positive-going spike produced by the differentiator circuit 69 occurs after a total elapsed time of 12 microseconds (5+7=12) and the single-stripe flip-flop 73 goes high after a total elapsed time of 13 microseconds (4+1+8=13); for a 15-microsecond pulse, the positive-going spike produced by the differentiator circuit 69 occurs after a total elapsed time of 22 microseconds (15+7=22) and the output signal of the single-stripe flip-flop 73 is high from 13-microseconds (4+1+8=13) to 21.25 microseconds (4+1+16.25=21.25).

The output signal produced by the AND-gate 97 when each of the concurrent standardized pulses produced by the standardizer sections 16a and 16b is of proper width is applied to the 1-microsecond one-shot multivibrator 100 (via the OR-gate 99) to cause the one-shot multivibrator to generate a loading signal on the LOAD 2 line, FIG. 5(e). The loading signal then serves to load binary "zeros," corresponding to the non-retroreflective black second stripe, into the buffer flip-flops FF3 and FF4. Thus, after the second loading signal, the buffer flip-flops FF1-FF4 can be considered to store the binary digit 1100.

The loading signal produced by the one-shot multivibrator 100 is also applied to the 13-microsecond one-shot multivibrator 107, causing a 13-microsecond output pulse to be produced by the one-shot multivibrator 107, FIG. 5(e), and applied to the differentiator circuit 109. The differentiator circuit 109 differentiates the output pulse produced by the one-shot multivibrator 107, producing a negative-going spike corresponding to the leading edge of the pulse from the one-shot multivibrator 107 and a positive-going spike corresponding to the trailing-edge. Assuming that no new pulses are produced by the standardizer circuitry 16 during the 13 microsecond "checking" interval to cause resetting of the shift enable flip-flop 80, the positive-going spike produced by the differentiator circuit 109 is coincident with the high-level output of the shift enable flip-flop 80 (due to the effect of the "19" timing signal), (FIG. 5(k)), thereby causing an output signal to be produced by the AND-gate 111 and to be applied to the 1-microsecond one-shot multivibrator 113. The one-shot multivibrator 113 generates a shift pulse on the SHIFT line, FIG. 5(m), to enable the storage shift registers 60 to receive and further process the pulses stored in the buffer flip-flops FF1-FF4. Assuming also that new pulses are produced by the standardizer circuitry 16 within 61 microseconds of the production by the standardizer sections 16a and 16b of the original pulses (now stored in the storage shift registers 60), to cause clearing of the synchronous counter 81, no reset signal, such as shown in FIG. 5(n), is produced to reset the storage shift registers 60.

Although no specific discussion will be presented herein, it may be noted that similar operation as described hereinabove occurs for orange-black and blue-black stripe-pairs.

BLUE-BLUE STRIPE PAIR

When the first and second blue stripes are scanned in succession (by the apparatus shown in FIG. 3(a)), two essentially consecutive, contiguous pulses are produced by the "BLUE" standardizer section 16b, resulting, in effect, in a single standardized pulse having a width of 14.25-30.35 microseconds, as shown in FIG. 5(f). The single-standardized pulse is applied to the differentiator circuit 103, via the OR-gate 105, and also to the integrator-Schmitt trigger circuit 61. The differentiator circuit 105 operates to differentiate the standardized pulse, producing a negative-going spike corresponding to the leading-edge of the standardized pulse and a positive-going spike corresponding to the trailing-edge. The differentiated signal produced by the differentiator circuit 103 is applied to the AND-gate 101.

The integrator-Schmitt trigger circuit 61, in response to the single standardized pulse, operates to delay the leading-edge of the standardized pulse by 4 microseconds and the trailing-edge by 7 microseconds, FIG. 5(g). Actually, the leading-edge of the first pulse comprising the first half of the single standardized pulse is delayed by 4 microseconds and the trailing-edge of the second pulse comprising the second half of the single standardized pulse is delayed by 7 microseconds. The leading-and-trailing-edge-delayed pulse produced by the integrator-Schmitt trigger circuit 61 is applied to the OR gate 71, together with the corresponding undelayed standardized pulse, causing a "stretched" version of the standardized pulse (21.25-37.25 microseconds) to be produced and applied simultaneously to the input terminals B of the buffer flip-flops FF2 and FF4. It is to be noted that no pulses are applied to either of the input terminals B of the buffer flip-flops FF1 and FF3 inasmuch as no pulses are produced by the "ORANGE" standardizer section 16b in response to the two blue stripes being scanned.

The leading-and-trailing-edge-delayed pulse produced by the integrator-Schmitt trigger circuit 61 is also applied to the OR-gate 63 and, after 4 microseconds (that is, when the output pulse of the integrator-Schmitt trigger circuit 61 goes low), gated through the NOR-gate 65 by the normally high signal applied to the LOAD INHIBIT line by the read flip-flop 90. The output pulse produced by the NOR-gate 65 is applied to the 1-microsecond one-shot multivibrator 67. On the leading-edge of the output pulse produced by the NOR-gate 65, the 1-microsecond one-shot multivibrator 67 is operated to produce a 1-microsecond pulse, FIG. 5(h), on the LOAD 1 line and also on the RESET-SET line. The output pulse produced by the one-shot multivibrator 67 on the LOAD 1 line is applied to the gating terminal A of the buffer flip-flop FF2 and serves to load the "stretched" standardized pulse applied to the input terminal A of the buffer flip-flop FF2 into the buffer flip-flop FF2. It may be noted that the loading signal on the LOAD 1 line is also applied to the input terminal A of the buffer flip-flop FF1. However, inasmuch as there is no pulse present at the input terminal B of the buffer flip-flop FF1, no pulse is gated therein. Thus, the buffer flip-flop FF1, in effect, stores a binary "zero" while the buffer flip-flop FF2 stores a binary "one."

The output pulse produced by the one-shot multivibrator 67 on the RESET-SET line serves to ensure that the single-stripe flip-flop 73 and the stripe-pair flip-flop 77 are in the "reset" condition, to reset the shift enable flip-flop 80, to clear the synchronous counter 81, and to set the counter enable flip-flop 83 to enable the synchronous counter 81 to begin counting pulses from the one-shot multivibrator 87 at intervals of 0.25 microseconds.

When the 9.25-microsecond count is sensed by the count-sensing gates 91, the "9.25" timing signal is applied to the set terminal S of the stripe-pair flip-flop 77 to cause the output thereof to go from low to high, noting FIG. 5(i). As may be further noted from FIGS. 5(f) and 5(i), and as indicated in FIG. 4(b), the output of the stripe-pair flip-flop 77 goes high 14.25 microseconds (4+1+9.25) after the leading edge of the standardized pulse, FIG. 5(f), and goes low again after 16 microseconds, that is, when the "25.25" timing signal resets the stripe-pair flip-flop 77 (via the OR-gate 79). It is apparent, therefore, that no output pulse will be produced by the AND-gate 101 to generate a loading signal on the LOAD 2 line (via the OR-gate 99 and the 1-microsecond one-shot multivibrator 100) unless the positive-going spike in the differentiated signal from the differentiator circuit 103 is applied to the AND-gate 101 during the 16 microsecond (25.25-9.25 =16) "gating" interval produced at the output of the stripe-pair flip-flop 77. This condition is satisfied so long as the standardized pulse, FIG. 5(f), has a width of 14.25-30.25 microseconds.

For example, for a standardized pulse of the minimum acceptable width of 14.25 microseconds, the differentiator circuit 103 applies a positive-going spike (corresponding to the trailing edge of the 14.25-microsecond pulse) to the AND-gate 101 14.25 microseconds after the leading edge of the standardized pulse, and the "9.25" timing signal is applied to the stripe-pair flip-flop 77 14.25 microseconds (4+1+9.25 =14.25) after the leading-edge of the pulse. Since the two signals applied to the AND-gate 101 are in coincidence, an output signal is produced by the AND-gate 101 to initiate the generation of a loading signal on the LOAD 2 line. Similarly, if the standardized pulse has a maximum acceptable width of 30.25 microseconds, the differentiator circuit 103 applies a positive-going spike (corresponding to the trailing edge of the 30.25-microsecond pulse) to the AND-gate 101 30.25 microseconds after the leading-edge of the standardized pulse, and the "25.25" timing signal is applied to the stripe-pair flip-flop 77 30.25-microseconds (4+1+25.25=30.25) after the leading edge of the pulse. Again, since the two signals applied to the AND-gate 101 are in coincidence, an output signal is produced by the AND-gate 97 to initiate the generation of a loading signal on the LOAD 2 line.

By similar analysis, it can be shown that if a standardized pulse is greater than 30.25 microseconds in width, or less than 14.25 microseconds in width, the two input signals applied to the AND-gate 101 in each case are not coincident and, hence, no output signal is produced by the AND-gate 101. For example, for a 31-microsecond pulse, the positive-going spike produced by the differentiator circuit 103 occurs after a total elapsed time of 31 microseconds and the stripe-pair flip-flop 77 is high from 14.25 microseconds (4+1+9.25=14.25) to 30.25 microseconds (4+1+25.25=30.25). For a 14-microsecond pulse, the positive-going spike produced by the differentiator circuit 103 occurs after a total elapsed time of 14 microseconds and the stripe-pair flip-flop 77 goes high after a total elapsed time of 14.25 microseconds (4+1+9.25=14.25). In this latter case, however, the 14-microsecond pulse-width falls within the range of pulse-widths (6–14.25 microseconds) which can be processed by operation, inter alia, of the single-stripe flip-flop 73 and the AND-gate 97, as previously described. Accordingly, a loading signal is caused to be produced on the LOAD 2 line by the AND-gate 97, and the standardized pulse present at the input terminal B of the buffer flip-flop FF4 is gated therein by the loading signal. However, if the pulse is stored in the buffer flip-flop FF4 represents incorrect information, the signals processed in the system are rejected by the 13 microsecond or 61-microsecond timing "tests," previously described, or, subsequently, by the label-data-recognition arrangement 18b, or by suitable parity-checking apparatus (not shown).

The output signal produced by the AND-gate 101 when the standardized pulse produced by the "blue" standardizer section 16b, FIG. 5(f), is of proper width is applied to the 1-microsecond one-shot multivibrator 100 (via the OR-gate 99) to cause the one-shot multivibrator to generate a loading signal on the LOAD 2 line, FIG. 5(j). The loading signal then serves to load the standardized pulse present at the input terminal B of the buffer flip-flop FF4 into the buffer flip-flop FF4. Although the loading signal on the LOAD 2 line is also applied to the input terminal B of the buffer flip-flop FF3, no pulse is gated therein inasmuch as no pulse is present at the input terminal B of the buffer flip-flop FF3. Thus, after the second loading signal on the LOAD 2 line has terminated, the buffer flip-flops FF1–FF4 can be considered to store the binary digit 0101.

After the second loading signal is produced on the LOAD 2 line, as discussed hereinabove, the pulses stored in the buffer flip-flops FF1–FF4 are tested in accordance with the 13-microsecond timing "test" and the 61-microsecond timing "test" and then shifted in appropriate fashion into the storage shift registers 60. Since the apparatus for performing the above-mentioned tests and shifting operation is the same as that described in detail hereinbefore, it is not believed that further discussion is necessary here.

Although no specific discussion will be presented herein, it is to be noted that similar operation as described above occurs for all stripe-pairs, except for stripe-pairs where the second stripe is black. In the case of an orange-blue stripe-pair or a blue-orange stripe-pair, the standardized pulse the width of which is to be measured is produced by the OR-gate 105 by combining the successive standardized pulses derived in response to the two stripes being scanned in succession.

MODIFICATIONS

Although a vehicle identification system has been disclosed which utilizes a coded retroreflective label, a specific two-position base-four coding format, and visible light, it is to be appreciated that the features of the present invention may be employed in systems involving objects other than vehicles, types of labels other than retroreflective labels, types of code formats other than a two-position base-four coding format, and forms of electromagnetic radiation other than visible light.

What is claimed is:

1. A system for processing information relating to an object comprising:

a plurality of code elements associated with the object and arranged in a predetermined coded pattern to represent information relating to the object, said plurality of code elements comprising code elements of a first width and code elements of a second width, each of the code elements of the first width including a first portion and a second portion;

information-sensing means for sensing in succession the information encoded in the plurality of code elements and operative in response to sensing the information encoded in each code element of the first width to produce a pair of successive electrical pulses, said pair of electrical pulses corresponding to the first and second portions of the code element of the first width, and operative in response to sensing the information encoded in each code element of the second width to produce a single electrical pulse, said single pulse corresponding to the code element of the second width;

first circuit means operative in response to each pair of pulses corresponding to a code element of the first width and produced by the information-sensing means to produce a corresponding first gating signal (LOAD 1), and operative in response to each single pulse corresponding to a code element of the second width and produced by the information-sensing means to produce a corresponding first gating signal (LOAD $1^1$);

timing circuit means adapted to receive each pair of pulses corresponding to a code element of the first width and each single pulse corresponding to a code element of the second width, said timing circuit means being operative in response to the leading edge of the first pulse and the trailing edge of the second pulse of each pair of pulses corresponding to a code element of the first width to determine whether the leading and trailing edges occur within a predetermined first time duration and to produce a corresponding second gating signal (LOAD 2) if the leading-and-trailing edges occur within the predetermined first time duration, and operative in response to the leading-and-trailing edges of each single pulse corresponding to a code element of the second width to determine whether the leading-and-trailing edges thereof occur within a predetermined second time duration and to produce a corresponding second gating signal (LOAD $2^1$) if the leading and trailing edges occur within the predetermined second time duration; storage means for storing information-representing signals;

signal-presenting means coupled to the information-sensing means and to the storage means and operative in response to the first and second pulses of each pair of pulses produced by the information sensing means corresponding to a code element of the first width to present corresponding first and second information-representing signals ($I_1$) and ($I_2$) to the storage means, and operative in response to each single pulse produced by the information sensing means corresponding to a code element of the second width to present corresponding first and second information-representing signals ($I_1^1$) and ($I_2^1$) to the storage means; and second circuit means operative in response to the first and second gating signals (LOAD 1) and (LOAD 2) corresponding to each code element of the first width to gate into the storage means the first and second information-representing signals ($I_1$) and ($I_2$) corresponding to said code element, and operative in response to the first and second gating signals (LOAD $1^1$) and (LOAD $2^1$) corresponding to each code element of the second width to gate into the storage means the first and second information-representing signals ($I_1^1$) and ($I_2^1$) corresponding to said code element.

2. A system in accordance with claim 1 wherein: the first circuit means includes:
delay and logic circuit means operative in response to each pair of pulses corresponding to a code element of the first width to produce an output pulse having its leading edge delayed with respect to the leading edge of the first one of the pair of pulses by a predetermined first time duration and its trailing-edge delayed with respect to the trailing-edge of the other one of the pair of pulses by a predetermined second time duration, and operative in response to each single pulse corresponding to a code element of the second width to produce an output pulse having its leading-edge delayed with respect to the leading-edge of the single pulse by the predetermined first time duration and its trailing-edge delayed with respect to the trailing-edge of the single pulse by the predetermined second time duration; and
means operative in response to each output pulse produced by the delay and logic circuit means, in response to receiving a pair of pulses, to produce a corresponding gating signal (LOAD 1), and operative in response to each output pulse produced by the delay and logic circuit means, in response to receiving a single pulse, to produce a corresponding gating signal (LOAD $1^1$).

3. A system in accordance with claim 2 wherein:
the delay and logic circuit means includes integrator-Schmitt trigger circuit means and an OR gate means connected to the integrator-Schmitt trigger circuit means; and wherein
the last-mentioned means in claim 2 includes a one-shot multivibrator circuit means.

4. A system in accordance with claim 1 wherein:
the timing circuit means comprises:
first means operative in response to the leading edge of the first pulse of each pair of pulses corresponding to a code element of the first width to produce an output pulse having a predetermined first time duration;
second means operative in response to the trailing-edge of the second one of said pair of pulses to produce a signal corresponding to said trailing-edge;
third means adapted to receive the output pulse produced by the first means and the signal produced by the second means and operative to produce a corresponding gating signal (LOAD 2) if the signal from the second means occurs during the predetermined first time duration of the output pulse produced by the first means;
fourth means operative in response to the leading edge of each single pulse corresponding to a code element of the second width to produce an output pulse having a predetermined second time duration;
fifth means operative in response to the trailing-edge of said single pulse to produce a signal corresponding to said trailing edge; and
sixth means adapted to receive the output pulse produced by the fourth means and the signal produced by the fifth means and operative to produce a corresponding gating signal (LOAD $2^1$) if the signal from the fifth means occurs during the predetermined second time duration of the output pulse produced by the fourth means.

5. A system in accordance with claim 4 wherein:
the first means includes a flip-flop circuit means;
the second means includes a differentiator circuit means;
the third means includes an AND gate means connected to the flip-flop circuit means included in the first means and to the differentiator circuit means included in the second means;
the fourth means includes a flip-flop circuit means;
the fifth means includes a differentiator circuit means; and
the sixth means includes an AND gate means connected to the flip-flop circuit means included in the fourth means and to the differentiator circuit means included in the fifth means.

6. A system in accordance with claim 5 wherein:
the first means further includes:
means operative in response to the leading edge of the first pulse of each pair of pulses corresponding to a code element of the first width to produce a train of successive pulses:
counter means operative to count said pulses: and
count-sensing means operative to sense predetermined counts of the counter means and to produce and apply corresponding timing signals to the flip-flop circuit means included in the first means.

7. A system in accordance with claim 5 wherein:
the fourth means further includes:
means operative in response to the leading-edge of each single pulse corresponding to a code element of the second width to produce a train of successive pulses;
counter means operative to count said pulses; and count-sensing means operative to sense predetermined counts of the counter means and to produce and apply corresponding timing signals to the flip-flop circuit means included in the fourth means.

8. A system in accordance with claim 1 wherein:
the timing circuit means comprises:
delay and logic circuit means operative in response to each pair of pulses corresponding to a code element of the first width to produce an output pulse having its leading-edge delayed with respect to the leading-edge of the first one of the pair of pulses by a predetermined first time duration and its trailing-edge delayed with respect to the trailing-edge of the other one of the pair of pulses by a predetermined second time duration, and operative in response to each single pulse corresponding to a code element of the second width to produce an output pulse having its leading-edge delayed with respect to the leading edge of the single pulse by the predetermined first time duration and its trailing-edge delayed with respect to the trailing-edge of the single pulse by the predetermined second time duration;
means operative in response to each output pulse produced by the delay and logic circuit means, in response to receiving a pair of pulses, to produce a corresponding timing signal, and operative in response to each output pulse produced by the delay and logic circuit means, in response to receiving a single pulse, to produce a corresponding timing signal;
first timing means operative in response to each timing signal corresponding to a pair of pulses to produce an output pulse having a predetermined first time duration;
first differentiator circuit means adapted to receive each pair of pulses corresponding to a code element of the first width and operative in response to the trailing edge of the second one of the pair of pulses to produce a signal corresponding to said trailing-edge;
first gating circuit means adapted to receive each output pulse produced by the first timing means and each signal corresponding to a trailing-edge produced by the first differentiator circuit means and operative to produce a gating signal (LOAD 2) only if a signal produced by the first differentiator circuit means is received during the predetermined first time duration of an output pulse produced by the first timing means;

second timing means operative in response to each timing signal corresponding to a single pulse to produce an output pulse having a predetermined second time duration;

second differentiator circuit means adapted to receive each output pulse produced by the delay and logic circuit means corresponding to a single stripe and operative in response to the trailing-edge of said pulse to produce a signal corresponding to said trailing edge; and second gating circuit means adapted to receive each output pulse produced by the second timing means and each signal corresponding to a trailing-edge produced by the second differentiator circuit means and operative to produce a gating signal (LOAD $2^1$) only if a signal produced by the second differentiator circuit means is received during the predetermined second time duration of an output pulse produced by the second timing means.

9. A system in accordance with claim 8 wherein:

the first gating circuit means includes:

an AND gate means connected to the first timing means and to the first differentiator circuit means; and a one-shot multivibrator circuit means coupled to said AND gate means; and the second gating circuit means includes:

an AND gate means connected to the second timing means and to the second differentiator circuit means; and the one-shot multivibrator circuit means, said one-shot multivibrator circuit means being coupled to the last-mentioned AND gate means.

10. A system in accordance with claim 9 wherein:

the code elements of the first and second widths are radiation-reflecting elements; and the information-sensing means includes:

means for scanning the radiation-reflecting elements of the first and second widths with an incident beam of electromagnetic radiation; and means arranged to receive electromagnetic radiation reflected from the radiation-reflecting elements and operative in response to electromagnetic radiation received after reflection from each of the radiation-reflecting elements of the first width to produce a pair of electrical signals representative of the information encoded in the radiation-reflecting element of the first width, and operative in response to electromagnetic radiation received after reflection from each of the radiation-reflecting elements of the second width to produce a single electrical pulse representative of the information encoded in the radiation-reflecting element of the second width.

11. A system in accordance with claim 10 wherein the radiation-reflecting elements are retroreflective elements and the electromagnetic radiation is visible light.

12. A system in accordance with claim 9 wherein:

the first and second portions of each of the code elements of the first width and the code elements of the second width are selected from retroreflective stripes of a first color, a second color, and a third color.

13. A system in accordance with claim 1, further comprising:

timing-checking means adapted to determine whether any new pulses have been produced by the information-sensing means within a predetermined time period after the first and second information-representing signals ($I_1$) and ($I_2$) corresponding to each code element of the first width and the first and second information-representing signals ($I_1^1$) and ($I_2^1$) corresponding to each code element of the second width have been gated into and stored in the storage means, said timing-checking means being operative to permit further processing of the information-representing signals gated into and stored in the storage means if no new pulses are produced by the information-sensing means within the predetermined time period, and operative to prevent further processing of the information-representing signals if new pulses are produced by the information-sensing means within the predetermined time period.

14. A system in accordance with claim 1 wherein:

said storage means is a temporary storage means; and wherein said system further comprises:

additional storage means operative in response to a shifting signal to receive and store information-representing signals stored in the temporary storage means and operative in response to a resetting signal to be placed in a cleared state;

first timing-checking means adapted to determine whether any new pulses have been produced by the information-sensing means within a predetermined time period after the first and second information-representing signals ($I_1$) and ($I_2$) corresponding to each code element of the first width and the first and second information-representing signals ($I_1^1$) and ($I_2^1$) corresponding to each code element of the second width have been gated into and stored in the storage means, said first timing-checking means being operative to produce and apply a shifting signal to the additional storage means to cause the additional storage means to receive and store the information-representing signals stored in the temporary storage means if no new pulses are produced by the information-sensing means within the predetermined time period, and operative to prevent the additional storage means from receiving and storing the information-representing signals if new pulses are produced by the information-sensing means within the predetermined time period; and second timing-checking means adapted to measure the time occurring between the beginning of each set of pulses produced by the information-sensing means and the next set of pulses produced by the information-sensing means and operative to produce and apply a resetting signal to the additional storage means to cause said additional storage means to be placed in the cleared state if any measured time is less than a predetermined value, said predetermined value being equal to the expected time duration occurring between the beginnings of successive sets of pulses produced by the information-sensing means and corresponding to successive code elements.

15. A system in accordance with claim 1 wherein:

the code elements of the first and second widths are radiation-reflecting elements; and the information-sensing means includes:

means for scanning the radiation-reflecting elements of the first and second widths with an incident beam of electromagnetic radiation; and means arranged to receive electromagnetic radiation reflected from the radiation-reflecting elements and operative in response to electromagnetic radiation received after reflection from each of the radiation-reflecting elements of the first width to produce a pair of electrical signals representative of the information encoded in the radiation-reflecting element of the first width, and operative in response to electromagnetic radiation received after reflection from each of the radiation-reflecting elements of the second width to produce a single electrical signal representative of the information encoded in the radiation-reflecting element of the second width.

16. A system in accordance with claim 15 wherein the radiation-reflecting elements are retroreflective elements and, the electromagnetic radiation is visible light.

17. A system in accordance with claim 1 wherein:

the first and second portions of the code elements of the first width and the code elements of the second width are selected from retroreflective stripes of a first color, a second color, and a third color.

18. A system in accordance with claim 1 wherein:
the storage means includes:
first and second flip-flop circuit means for respectively storing the first and second information-representing signals ($I_1$) and ($I_2$) corresponding to each code element of the first width; and
third and fourth flip-flop circuit means for respectively storing the first and second information-representing signals ($I_1^1$) and ($I_2^1$) corresponding to each code element of the second width.

* * * * *